United States Patent
Ganiger et al.

(10) Patent No.: US 12,025,266 B1
(45) Date of Patent: Jul. 2, 2024

(54) SELF-CLEANING CONDUITS FOR HYDROCARBON FLUIDS

(71) Applicant: General Electric Company, Schenectady, NY (US)

(72) Inventors: Ravindra Shankar Ganiger, Bengaluru (IN); Scott Alan Schimmels, Miamisburg, OH (US); Hiranya Nath, Bengaluru (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 18/319,179

(22) Filed: May 17, 2023

(30) Foreign Application Priority Data

Dec. 26, 2022 (IN) .............................. 202211075525

(51) Int. Cl.
*F16N 21/00* (2006.01)
*F16N 33/00* (2006.01)

(52) U.S. Cl.
CPC .............. *F16N 21/00* (2013.01); *F16N 33/00* (2013.01); *F16N 2210/08* (2013.01); *F16N 2210/12* (2013.01)

(58) Field of Classification Search
CPC ...... F16N 21/00; F16N 33/00; F16N 2210/08; F16N 2210/12
See application file for complete search history.

(56) References Cited

U.S. PATENT DOCUMENTS

| | | | |
|---|---|---|---|
| 6,318,641 B1 | 11/2001 | Knebel et al. | |
| 9,297,310 B2 | 3/2016 | Giri et al. | |
| 9,492,906 B2 | 11/2016 | Rösing et al. | |
| 10,202,939 B2 | 2/2019 | Widdle | |
| 2007/0235554 A1 | 10/2007 | Williams et al. | |

FOREIGN PATENT DOCUMENTS

| | | |
|---|---|---|
| CN | 114593438 A | 6/2022 |
| JP | 2011140941 A | 7/2011 |
| JP | 6035008 B2 | 11/2016 |

OTHER PUBLICATIONS

Uchil et al., "Thermal expansion in various phases of Nitinol using TMA", Physica B: Condensed Matter, vol. 270, Issues 3-4, Oct. 1999, pp. 289-297.

*Primary Examiner* — Henry Y Liu
(74) *Attorney, Agent, or Firm* — Venable LLP; David D. Leege; Michele V. Frank

(57) ABSTRACT

A self-cleaning conduit for a hydrocarbon fluid. The conduit includes a tube having an interior surface defining a flow passage for the hydrocarbon fluid. The tube is formed of (i) a shape memory alloy or (ii) a first metal and a second metal having a coefficient of thermal expansion different from the first metal. At least one of a plurality of recesses and a plurality of protrusions are formed on the interior surface of the tube within the flow passage. The tube is characterized by a conduit contortion factor (CCF) from two tenths degrees Fahrenheit (0.2° F.) to fourteen degrees Fahrenheit (14° F.), and the conduit contortion factor (CCF) is one of an elastic conduit contortion factor ($CCF_E$) and thermal expansion conduit contortion factor ($CCF_{TE}$).

20 Claims, 22 Drawing Sheets

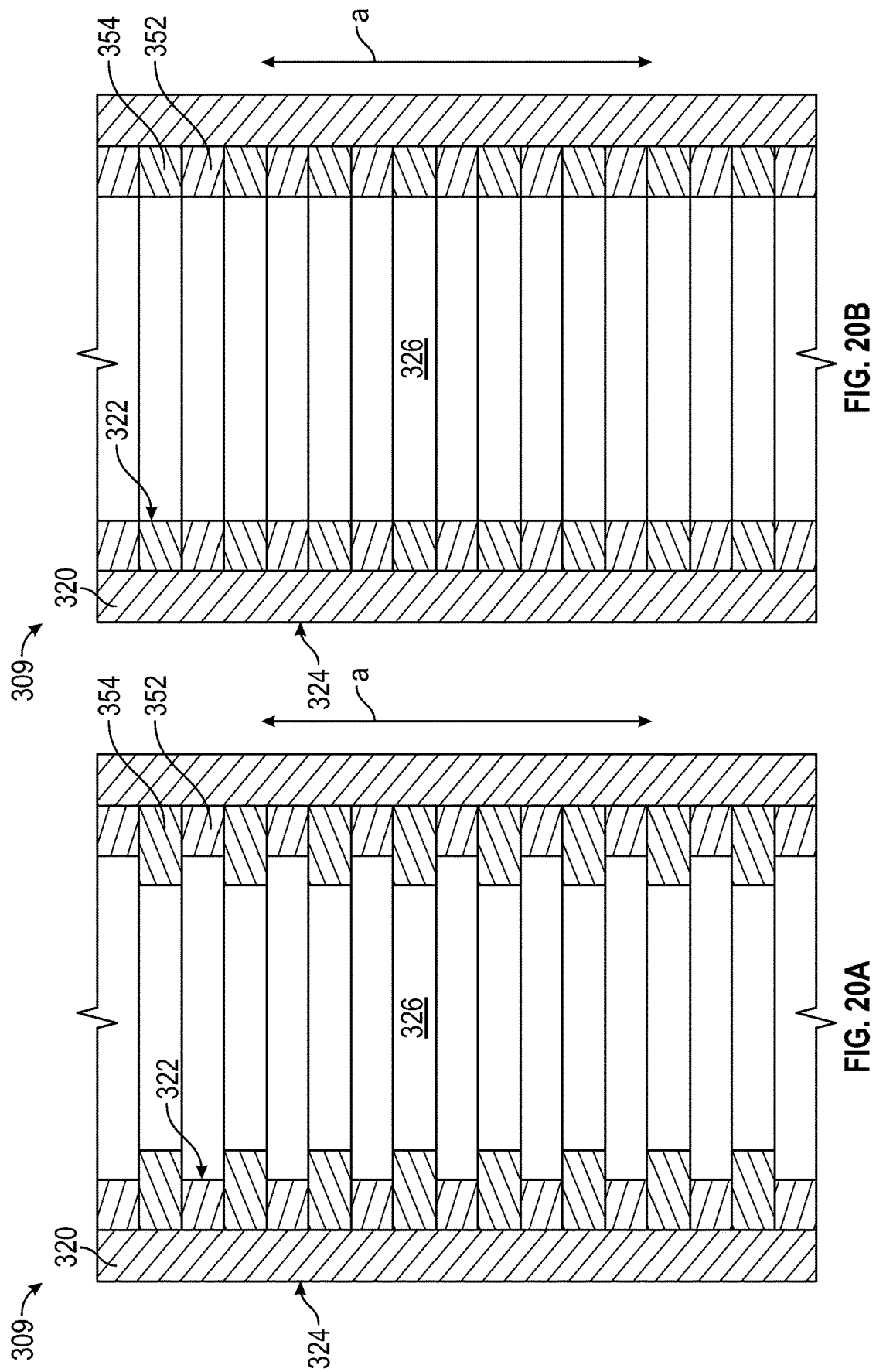

SELF-CLEANING CONDUITS FOR HYDROCARBON FLUIDS

CROSS REFERENCE TO RELATED APPLICATIONS

The present application claims the benefit of Indian Patent Application No. 202211075525, filed on Dec. 26, 2022, which is hereby incorporated by reference herein in its entirety.

TECHNICAL FIELD

The present disclosure relates to conduits carrying a hydrocarbon fluid, particularly, conduits in gas turbine engines.

BACKGROUND

Gas turbine engines use hydrocarbon fluids, such as fuels and lubricating oils. Such hydrocarbon fluids are conveyed through the engine in various conduits, and the interior surfaces of these conduits contact the hydrocarbon fluids. Carbonaceous deposits (also known as coke) may form on these surfaces when exposed to the hydrocarbon fluids at elevated temperatures, resulting in carbon becoming attached to these surfaces and building up as deposits on these surfaces.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 13A is an axial view of the oil tube, and FIG. 13B shows the top and the side of the oil tube.

FIG. 14A is an axial view of the oil tube, and FIG. 14B shows the top and the side of the oil tube.

FIG. 15A is an axial view of the oil tube, and FIG. 15B shows the top and the side of the oil tube.

FIG. 16A is an axial view of the oil tube, and FIG. 16B shows the top and the side of the oil tube.

FIG. 17A is an axial view of the oil tube, and FIG. 17B shows the top and the side of the oil tube.

FIG. 18A is an axial view of the oil tube, and FIG. 18B shows the top and the side of the oil tube.

FIG. 19A shows a low-temperature condition, and FIG. 19B shows a high-temperature condition.

FIGS. 20A and 20B are cross-sectional views of the oil tube according to another embodiment. FIG. 20A shows a low-temperature condition, and FIG. 20B shows a high-temperature condition.

DETAILED DESCRIPTION

Figure 1:
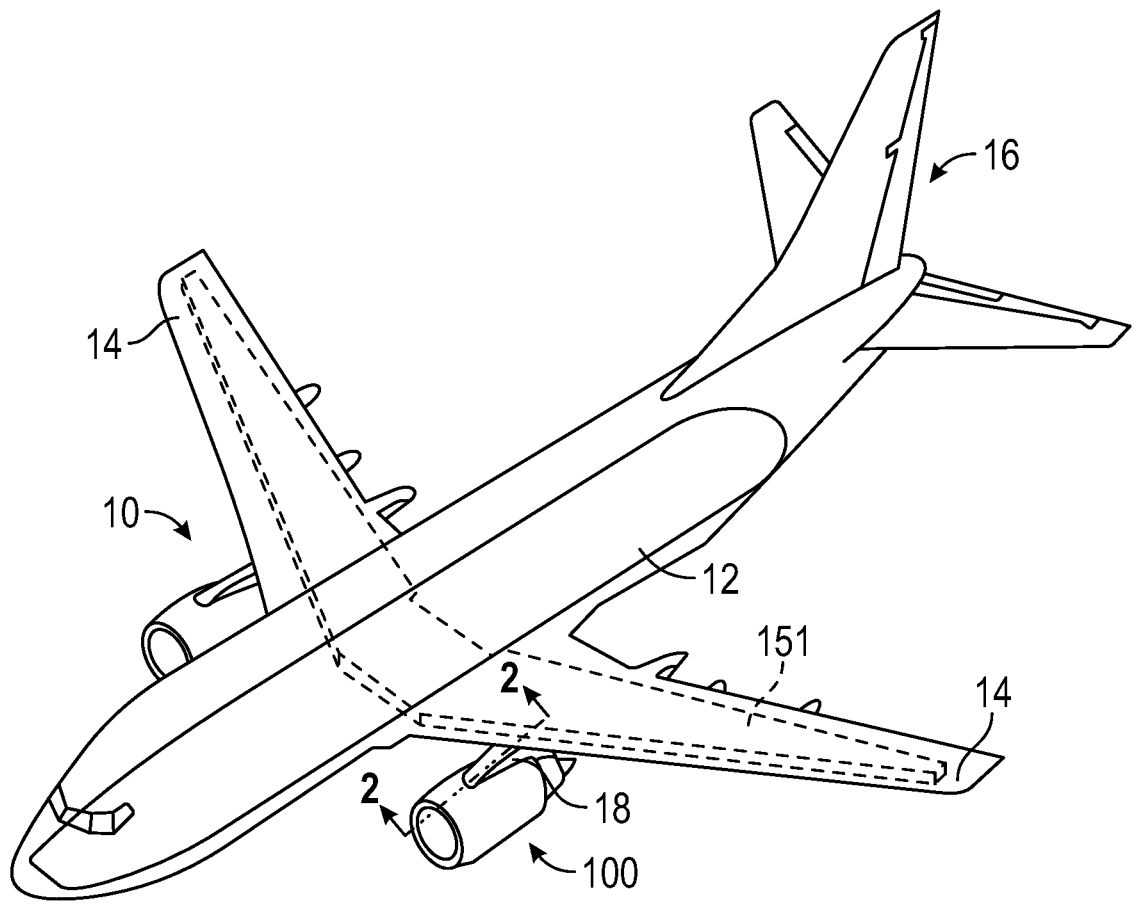
FIG. 1 is a schematic perspective view of an aircraft having a gas turbine engine.

Features, advantages, and embodiments of the present disclosure are set forth or apparent from a consideration of the following detailed description, drawings, and claims. Moreover, the following detailed descriptions are exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet, and aft refers to a position closer to an engine nozzle or an exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

Here and throughout the specification and the claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

As noted above, coke deposition may occur on surfaces of a gas turbine engine that are exposed to hydrocarbon fluids, such as fuels and lubricating oils, at elevated temperatures. The hydrocarbon fluids flow through various conduits including, for example, tubes, and the inner walls of such conduits are exposed to these hydrocarbon fluids. On such surfaces, coke can build up in considerable thickness, restricting or even blocking the fluid flow in such passages. In other situations, large pieces of coke can shed off these surfaces causing blockages or even damage to downstream components. In some components, these deposits can be removed by periodic maintenance, such as cleaning or replacement of the component. Such maintenance, however, can be expensive and time consuming, and there may be some components where such maintenance is not possible.

Tubes that may be particularly susceptible to such coking are oil tubes located in fairings of engine frames that support the gas turbine engine and, more specifically, a high-pressure shaft and a low-pressure shaft of the gas turbine engine. Oil is used to lubricate various components of the gas turbine engine including, for example, the bearings supporting the high-pressure shaft and the low-pressure shaft. To provide oil to these bearings, the oil flows through the oil tubes located in the engine frames. A portion of these oil tubes is located within the core air flow path of the gas turbine engine, and these portions of the tubes may be subjected to elevated temperature suitable for coke formation, particularly, after shutdown during, so-called, soak-back conditions. These oil tubes may be relatively narrow and, as a result of coke formation, may be susceptible to blockages forming in these oil tubes.

The embodiments discussed herein include hydrocarbon fluid conduits, such as an oil tube, that are self-cleaning. The hydrocarbon fluid conduits (oil tube) discussed herein are formed of a shape memory alloy (SMA) or bimetallic materials. These hydrocarbon fluid conduits (oil tube) may include protrusions, such as ridges, and/or recesses, such as grooves. When the hydrocarbon fluid conduit (oil tube) undergoes the thermal cycling that occurs during normal operation of the gas turbine engine, the hydrocarbon fluid conduit (oil tube) contorts, such as by a change in length, a change in diameter, and/or twisting. The protrusions and portions of the conduit between the grooves may also contort. The contortion of the hydrocarbon fluid conduit (oil tube) breaks up the deposits that have formed on the interior surface of the hydrocarbon fluid conduit. The disrupted coke deposits can then be removed by the natural flow of the hydrocarbon fluid (e.g., oil) past the interior surface, thus, avoiding the buildup of coke deposits. This is referred to herein as a self-cleaning effect.

The hydrocarbon fluid conduit discussed herein is particularly suitable for use in engines, such as a gas turbine engine used on an aircraft. FIG. 1 is a perspective view of an aircraft 10 that may implement various preferred embodiments. The aircraft 10 includes a fuselage 12, wings 14 attached to the fuselage 12, and an empennage 16. The aircraft 10 also includes a propulsion system that produces a propulsive thrust required to propel the aircraft 10 in flight, during taxiing operations, and the like. The propulsion system for the aircraft 10 shown in FIG. 1 includes a pair of engines 100. In this embodiment, each engine 100 is attached to one of the wings 14 by a pylon 18 in an under-wing configuration. Although the engines 100 are shown attached to the wing 14 in an under-wing configuration in FIG. 1, in other embodiments, the engine 100 may have alternative configurations and be coupled to other portions of the aircraft 10. For example, the engine 100 may additionally or alternatively include one or more aspects coupled to other parts of the aircraft 10, such as, for example, the empennage 16 and the fuselage 12.

As will be described further below with reference to FIG. 2, the engines 100 shown in FIG. 1 are gas turbine engines that are each capable of selectively generating a propulsive thrust for the aircraft 10. The amount of propulsive thrust may be controlled at least in part based on a volume of fuel provided to the engines 100 via a fuel system 150 (see FIG. 2). An aviation turbine fuel in the embodiments discussed herein is a combustible hydrocarbon liquid fuel, such as a kerosene-type fuel, having a desired carbon number, a synthetic aviation fuel, a biofuel, a biodiesel, an ethanol, a bioalcohol, and the like. The fuel is stored in a fuel tank 151 of the fuel system 150. As shown in FIG. 1, at least a portion of the fuel tank 151 is located in each wing 14 and a portion of the fuel tank 151 is located in the fuselage 12 between the wings 14. The fuel tank 151, however, may be located at other suitable locations in the fuselage 12 or the wing 14. The fuel tank 151 may also be located entirely within the fuselage 12 or the wing 14. The fuel tank 151 may also be separate tanks instead of a single, unitary body, such as, for example, two tanks each located within a corresponding wing 14.

Although the aircraft 10 shown in FIG. 1 is an airplane, the embodiments described herein may also be applicable to other aircraft, including, for example, helicopters and unmanned aerial vehicles (UAV). Further, although not depicted herein, in other embodiments, the gas turbine engine may be any other suitable type of gas turbine engine, such as an industrial gas turbine engine incorporated into a power generation system, a nautical gas turbine engine, etc.

Figure 2:
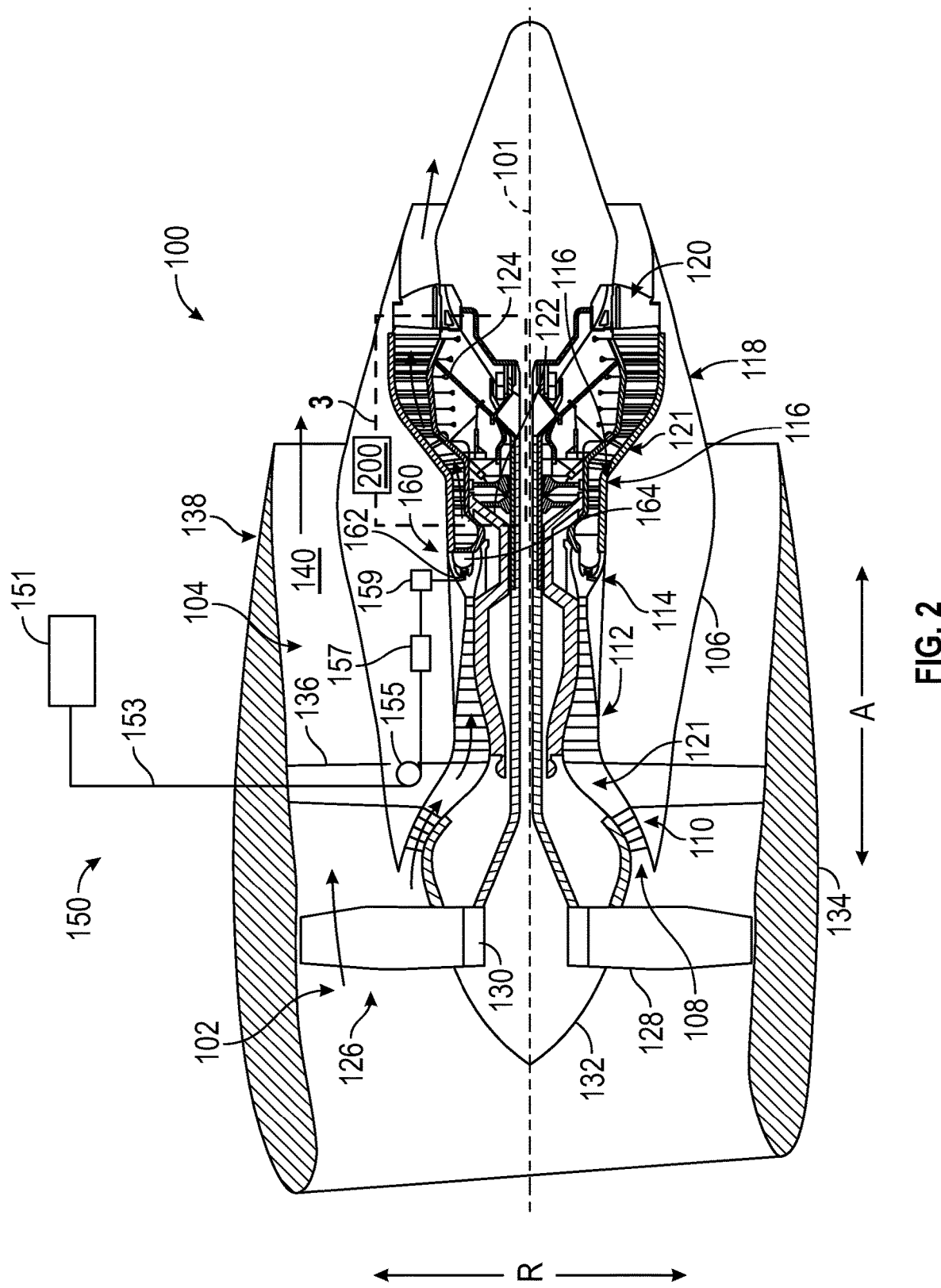
FIG. 2 is a schematic, cross-sectional view, taken along line 2-2 in FIG. 1, of one of the gas turbine engines of the aircraft shown in FIG. 1.

FIG. 2 is a schematic, cross-sectional view of one of the engines 100 used in the propulsion system for the aircraft 10 shown in FIG. 1. The cross-sectional view of FIG. 2 is taken along line 2-2 in FIG. 1. For the embodiment depicted in FIG. 2, the engine 100 is a high bypass turbofan engine. The turbofan engine (engine 100) has an axial direction A (extending parallel to a longitudinal centerline 101, shown for reference in FIG. 2), a radial direction R, and a circumferential direction. The circumferential direction (not depicted in FIG. 2) extends in a direction rotating about the longitudinal centerline 101 (the axial direction A). The turbofan engine (engine 100) includes a fan section 102 and a turbomachine 104 disposed downstream from the fan section 102.

The turbomachine 104 depicted in FIG. 2 includes a tubular outer casing 106 (also referred to as a housing or a nacelle) that defines an inlet 108. In this embodiment, the inlet 108 is annular. The outer casing 106 encases an engine core that includes, in a serial flow relationship, a compressor section including a booster or a low-pressure (LP) compressor 110 and a high-pressure (HP) compressor 112, a combustion section 114, a turbine section including a high-pressure (HP) turbine 116 and a low-pressure (LP) turbine 118, and a jet exhaust nozzle section 120. The compressor section, the combustion section 114, and the turbine section together define at least in part a core air flow path 121 extending from the inlet 108 to the jet exhaust nozzle section 120. The engine 100 further includes one or more drive shafts. More specifically, the engine 100 includes a high-pressure (HP) shaft or a spool 122 drivingly connecting the HP turbine 116 to the HP compressor 112, and a low-pressure (LP) shaft or a spool 124 drivingly connecting the LP turbine 118 to the LP compressor 110.

The fan section 102 shown in FIG. 2 includes a fan 126 having a plurality of fan blades 128 coupled to a disk 130. The fan blades 128 and the disk 130 are rotatable, together, about the longitudinal centerline (axis) 101 by the LP shaft 124. The LP compressor 110 may also be directly driven by the LP shaft 124, as depicted in FIG. 2. The disk 130 is covered by a rotatable front hub 132 that is aerodynamically contoured to promote an airflow through the plurality of fan blades 128. Further, an annular fan casing or an outer nacelle 134 circumferentially surrounds the fan 126 and/or at least a portion of the turbomachine 104. The nacelle 134 is supported relative to the turbomachine 104 by a plurality of circumferentially spaced outlet guide vanes 136. A downstream section 138 of the nacelle 134 extends over an outer portion of the turbomachine 104 so as to define a bypass airflow passage 140 therebetween.

The engine 100 is operable with the fuel system 150 and receives a flow of fuel from the fuel system 150. The fuel system 150 includes a fuel delivery assembly 153 providing the fuel flow from the fuel tank 151 to the engine 100, and, more specifically, to a plurality of fuel nozzles 162 that inject fuel into a combustion chamber 164 of a combustor 160 of the combustion section 114. The fuel tank 151 is an example of a fuel source that provides fuel to the fuel nozzles 162, as discussed in more detail below. The fuel delivery assembly 153 includes tubes, pipes, conduits, and the like, to fluidly connect the various components of the fuel system 150 to the engine 100. The fuel tank 151 is configured to store the hydrocarbon fuel, and the hydrocarbon fuel is supplied from the fuel tank 151 to the fuel delivery assembly 153. The fuel delivery assembly 153 is configured to carry the hydrocarbon fuel between the fuel tank 151 and the engine 100 and thus provides a flow path (fluid pathway) of the hydrocarbon fuel from the fuel tank 151 to the engine 100.

The fuel system 150 includes at least one fuel pump fluidly connected to the fuel delivery assembly 153 to induce the flow of the fuel through the fuel delivery assembly 153 to the engine 100. One such pump is a main fuel pump 155. The main fuel pump 155 is a high-pressure pump that is the primary source of pressure rise in the fuel delivery assembly 153 between the fuel tank 151 and the engine 100. The main fuel pump 155 may be configured to increase a pressure in the fuel delivery assembly 153 to a pressure greater than a pressure within the combustion chamber 164 of the combustor 160.

The fuel system 150 also includes a fuel metering unit 157 in fluid communication with the fuel delivery assembly 153. Any suitable fuel metering unit 157 may be used including, for example, a metering valve. The fuel metering unit 157 is positioned downstream of the main fuel pump 155 and upstream of a fuel manifold 159 configured to distribute fuel to the fuel nozzles 162. The fuel system 150 is configured to provide the fuel to the fuel metering unit 157, and the fuel metering unit 157 is configured to receive fuel from the fuel tank 151. The fuel metering unit 157 is further configured to provide a flow of fuel to the engine 100 in a desired manner. More specifically, the fuel metering unit 157 is configured to meter the fuel and to provide a desired volume of fuel, at, for example, a desired flow rate, to the fuel manifold 159 of the engine 100. The fuel manifold 159 is fluidly connected to the fuel nozzles 162 and distributes (provides) the fuel received to the plurality of fuel nozzles 162, where the fuel is injected into the combustion chamber 164 and combusted. Adjusting the fuel metering unit 157 changes the volume of fuel provided to the combustion chamber 164 and thus changes the amount of propulsive thrust produced by the engine 100 to propel the aircraft 10.

Figure 3:
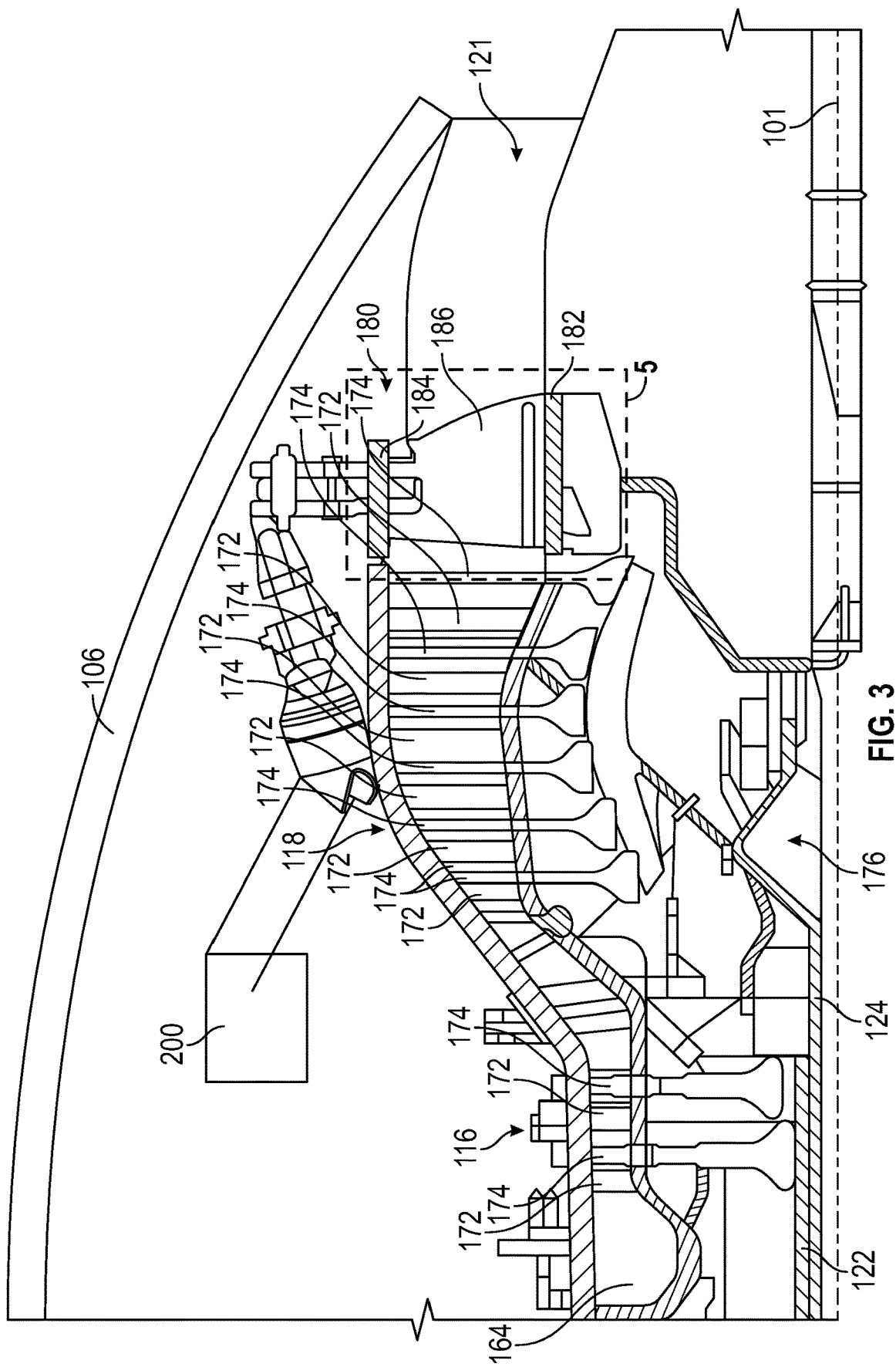
FIG. 3 is a detailed, cross-sectional view of the turbine of the gas turbine engine, showing detail 3 in FIG. 2.

FIG. 3 is a detailed, cross-sectional view of the turbine section. FIG. 3 shows detail 3 in FIG. 2. The compressor section and, more specifically, the LP compressor 110 and the HP compressor 112 (see FIG. 2), provides compressed air to the combustion chamber 164 where the compressed air is mixed with the fuel and combusted to generate combustion gases (combustion products). Each of the LP compressor 110 and the HP compressor 112 includes at least one rotor, such as compressor blades connected to a hub, for example. The combustion gases are discharged to the turbine section and, more specifically, the HP turbine 116 and the LP turbine 118. The HP turbine 116 may include alternating rows of stationary vanes 172 (or nozzles) and rotating turbine blades 174 (or buckets). The combustion gases expand in the HP turbine 116 and the expanding combustion gases rotate (drive) the turbine blades 174. The turbine blades 174 of the HP turbine 116 are connected to the HP shaft 122 and thus drive the HP compressor 112 through the HP shaft 122. The LP turbine 118 also may include alternating rows of stationary vanes 172 and rotating turbine blades 174. The combustion gases further expand in the LP turbine 118 and the expanding combustion gases rotate (drive) the turbine blades 174. The turbine blades 174 of the LP turbine 118 are connected to the LP shaft 124 and thus drive the LP compressor 110 and fan 126 through the LP shaft 124.

The HP shaft 122 and the LP shaft 124 are supported for rotation in one or more bearings 176. One or more turbine frames provide structural load paths from the bearings 176 to the outer casing 106, which forms a backbone structure of the engine 100. The turbine frame shown in FIG. 3 is a turbine rear frame 180. The engine 100 may also include other frames, not shown, such as a front frame forward of the HP compressor 112 and a turbine central frame. The following discussion focuses on the turbine rear frame 180 but also applies to the other frames of the engine 100.

The turbine rear frame 180 comprises an annular, centrally-located hub 182, surrounded by an annular outer ring 184. The hub 182 and the outer ring 184 are interconnected by a plurality of radially-extending struts (not shown). The turbine rear frame 180 may have, for example, six (6) equally-spaced struts around the circumferential direction. The turbine rear frame 180 may be a single integral unit or may be built up from individual components. The struts may be hollow and include a bleed-air port for cooling of the struts. The turbine rear frame 180 may also include a plurality of service tube assemblies 186 mounted in the turbine rear frame 180. The service tube assemblies 186 may be positioned between the struts, and extend between the hub 182 and the outer ring 184. In this example, six (6) service tube assemblies 186 are circumferentially spaced between each of the struts. As will be discussed in more detail below, each service tube assembly 186 includes a hollow service tube that may be used to convey a fluid to and from the inner core of the engine 100. The service tubes may be the hydrocarbon fluid conduits according to embodiments discussed herein and, in the particular embodiment discussed below, the service tube is an oil tube 300 (see FIG. 5) of a main lubrication system 200 (see FIG. 4).

Figure 4:
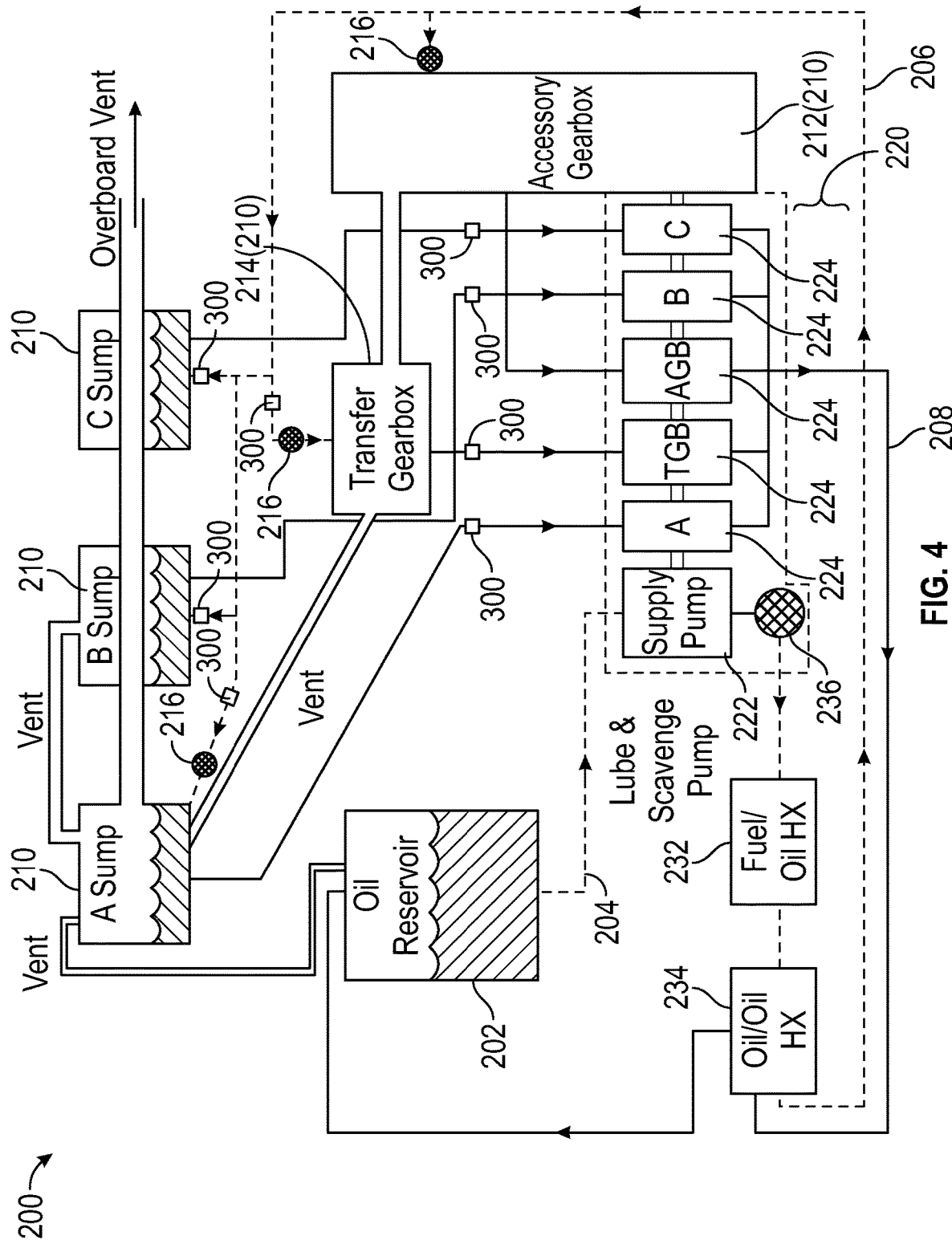
FIG. 4 is a schematic view of an oil system of the gas turbine engine shown in FIG. 2.

FIG. 4 is a schematic of the main lubrication system 200 of the engine 100. The main lubrication system 200 includes an oil reservoir 202 configured to store the oil. The main lubrication system 200 also includes an oil delivery assembly 204. The oil delivery assembly 204 is fluidly connected to the oil reservoir 202 and configured to distribute oil to the components of the main lubrication system 200 including various sumps 210 within the engine 100. The oil delivery assembly 204 includes tubes, pipes, conduits, and the like, to fluidly connect the various components of the main lubrication system 200. The oil delivery assembly 204 is configured to carry the oil between the oil reservoir 202 and the various sumps 210 within the engine 100 (see FIG. 2) and thus provides a flow path (fluid pathway) of the oil between the oil reservoir 202 and one or more sumps 210. The oil delivery assembly 204 includes, for example, supply lines 206 that are configured to supply the oil from the oil reservoir 202 to each sump 210 and scavenge lines 208 that are configured to provide a flow path for the oil from each sump 210 back to the oil reservoir 202. The supply lines 206 are shown with broken lines in FIG. 4, and the scavenge lines 208 are shown with solid lines in FIG. 4.

The sumps 210 (depicted as A sump, B sump, or C sump, in FIG. 4) may be any component of the engine 100 requiring lubrication including, for example, the bearing 176. Other sumps 210 include, for example, an accessory gearbox 212 or a transfer gearbox 214. The accessory gearbox 212 may be configured to transfer power from the main drive train of the engine 100 to various accessory systems of the engine 100 or the aircraft 10. The transfer gearbox 214 (also referred to as a reduction gearbox or a power gearbox) may be used in the drive train of the engine 100 to transfer power and torque from the turbomachine 104 to the fan section 102 (see FIG. 2). In some embodiments, the disk 130 (see FIG. 2) is connected to a fan shaft and the fan shaft is coupled to the LP shaft 124 (see FIG. 2) by the transfer gearbox 214, and the LP shaft 124 drives (rotates) the fan shaft by transferring power and torque through the transfer gearbox 214.

Some of the sumps 210 of the engine 100 are located radially within the core air flow path 121, such as, for example, the bearing 176 (see FIG. 3) and the transfer gearbox 214. To provide the oil to and remove oil from these sumps 210, the oil passes through the core air flow path 121. A portion of the oil delivery assembly 204, thus, includes the oil tube 300 of the service tube assembly 186 (see FIG. 5). As will be discussed further below, the oil tube 300 may be self-cleaning to remove coke that may build up within the oil tube 300. Accordingly, the main lubrication system 200 may also include a plurality of filters 216 located within various oil lines of the oil delivery assembly 204. The filter 216 is sized and positioned within the oil delivery assembly 204 to collect coke particles that may be dislodged from the oil tube 300 and before such particles enter portions of the main lubrication system 200 where they could cause clogging, such as oil nozzles providing oil to portions of the bearing 176 or the transfer gearbox 214.

The main lubrication system 200 includes at least one oil pump 220 fluidly connected to the oil delivery assembly 204 to induce the flow of oil through the oil delivery assembly 204. The main lubrication system 200 may include, for example, a supply pump 222 configured to draw oil from the oil reservoir 202 and to supply the oil to each sump 210. The supply pump 222 may be positioned downstream of the oil reservoir 202 and upstream of the sumps 210 relative to the flow of the oil within the oil delivery assembly 204. The main lubrication system 200 may also include a plurality of scavenge pumps 224 configured to scavenge (draw) the oil from each of the sumps 210 and to return the scavenged oil back to the oil reservoir 202. One scavenge pump 224 may be used for each sump 210, and each of the scavenge pumps 224 may be positioned downstream of the corresponding sump 210 and upstream of the oil reservoir 202 relative to the flow of the oil within the oil delivery assembly 204. The oil pumps 220 may be driven by the accessory gearbox 212.

The main lubrication system 200 may also include at least one heat exchanger configured to extract heat from the oil. In this embodiment, the main lubrication system 200 includes a fuel-to-oil heat exchanger 232 and an oil-to-oil heat exchanger 234. In this embodiment, the fuel-to-oil heat exchanger 232 and the oil-to-oil heat exchanger 234 are positioned downstream of the supply pump 222 and upstream of the sumps 210 relative to the flow of the oil within the oil delivery assembly 204. A main filter 236 may be positioned between the supply pump 222 and the fuel-to-oil heat exchanger 232 and/or the oil-to-oil heat exchanger 234 to remove any debris from the oil prior to the oil flowing to the fuel-to-oil heat exchanger 232, the oil-to-oil heat exchanger 234, and the sumps 210.

Figure 5:
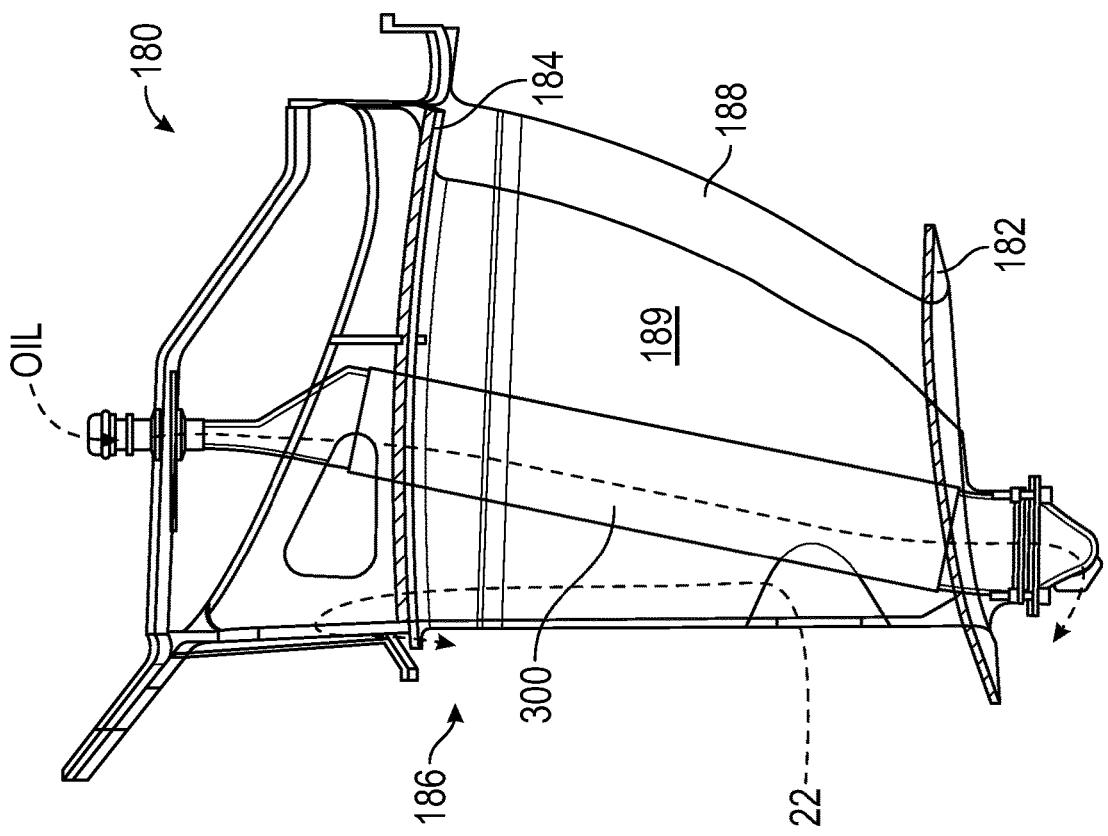
FIG. 5 is a detailed, cross-sectional view, showing detail 5 of FIG. 3, of a service tube assembly of a turbine rear frame.

FIG. 5 is a detailed, cross-sectional view, showing detail 5 of FIG. 3, of the service tube assembly 186 of the turbine rear frame 180. The service tube assembly 186 may include a service tube fairing 188. The service tube fairing 188 of this embodiment is an airfoil-shaped vane that is supported between the hub 182 and the outer ring 184. The service tube fairing 188 is hollow having a cavity 189, and the oil tube 300 is located within the cavity 189 of the service tube fairing 188. The service tube fairing 188 may include a plurality of holes, and compressor bleed air 22 from the compressor section may be supplied to the cavity 189 and expelled outwardly through the holes to cool the service tube fairing 188 when the engine 100 is operating.

Figure 6:
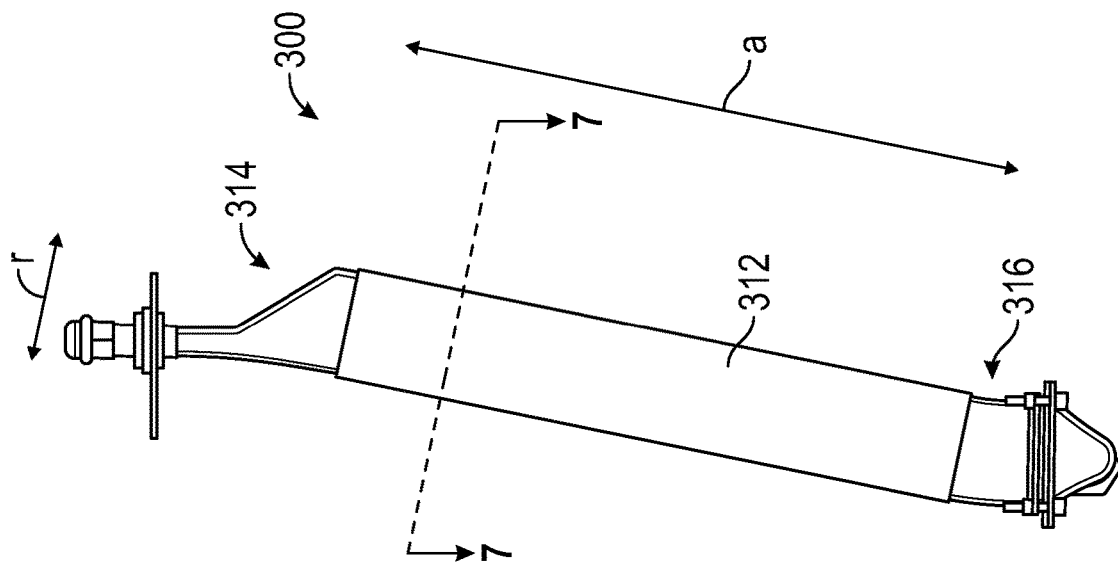
FIG. 6 shows an oil tube of the service tube assembly shown in FIG. 5.
Figure 7:
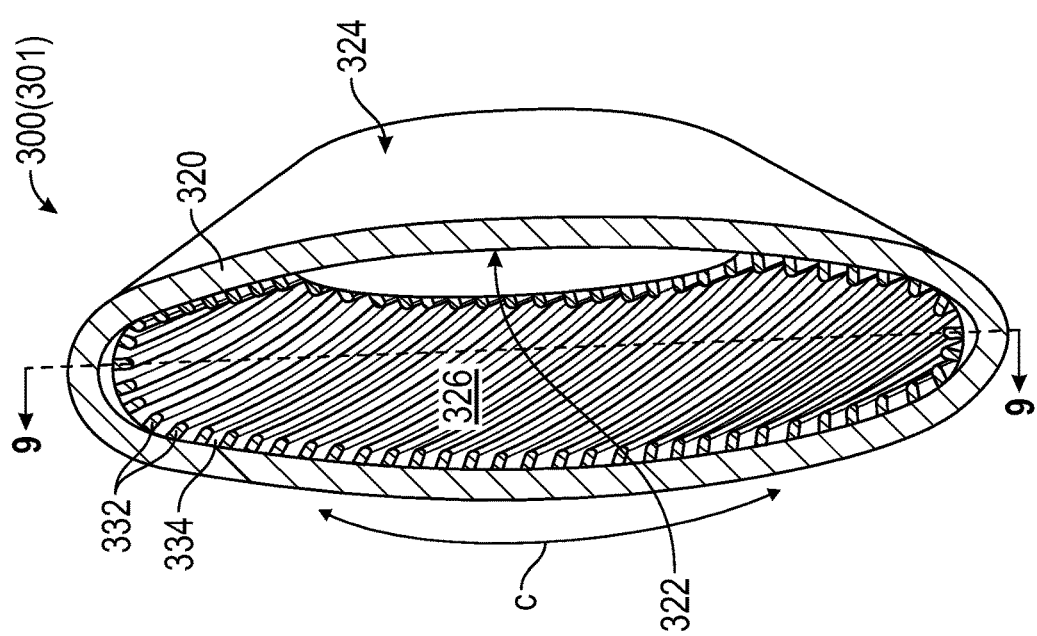
FIG. 7 is a cross-sectional view, taken along line 7-7 in FIG. 6, of the oil tube shown in FIG. 5.

FIG. 6 shows the oil tube 300 of the service tube assembly 186, and FIG. 7 is a cross-sectional view, taken along line 7-7 in FIG. 6, of the oil tube 300. The oil tube 300 has a central section 312 disposed between a reduced-diameter outer end 314 and a reduced-diameter inner end 316. The central section 312 is located within the cavity 189 of the service tube fairing 188 (see FIG. 5). The inner end 316 may include a generally cylindrical male fitting that forms a plug-in connection in cooperation with a female receptacle of one of the sumps 210 (see FIG. 4), such as the bearing 176 located within the turbine rear frame 180 (see FIG. 3). The outer end 314 includes a fitting used to fluidly connect the oil tube 300 with one of the supply line 206 or the scavenge line 208 (see FIG. 4). The oil tube 300 has an axial direction a, a radial direction r, and a circumferential direction c (see FIG. 7). Herein, lower case letters are used for the directions relative to the oil tube 300, as opposed to upper case letters for the directions relative to the engine 100. The axial direction a of the oil tube 300 extends generally in a radial direction R of the engine 100 (see FIG. 2) and, in this embodiment, the radial direction of the turbine rear frame 180 (see FIG. 5). The circumferential direction extends in a direction rotating about the axial direction a. As used herein, reference numeral 300 refers generically to the oil tubes discussed herein, and, when a specific oil tube is discussed, reference numerals 301, 302, 303, etc., will be used to refer to the specific oil tube.

As shown in FIG. 7, the oil tube 300 includes a wall 320 having an interior surface 322 and an exterior surface 324. The interior surface 322 defines a flow passage 326 for the oil (hydrocarbon fluid). The oil tube 300 and, more specifically, the wall 320 is annular. Although the oil tube 300 may have any suitable shape (e.g., a circular shape), the oil tube 300 and, more specifically, the wall 320 is elliptical, in this embodiment, having a major axis aligned in the axial direction A of the engine 100 (see FIG. 2).

Figure 8:
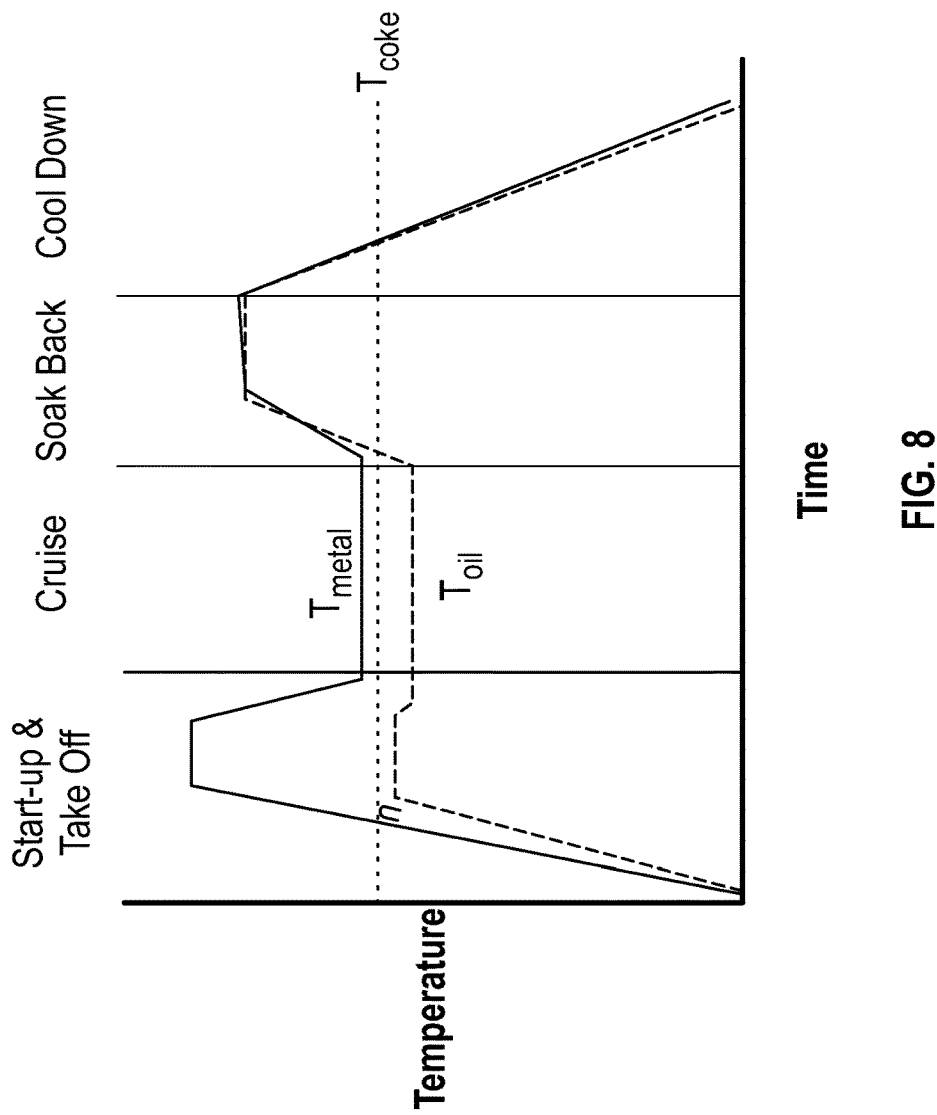
FIG. 8 is a graph showing the temperature of the oil and the temperature of the oil tube through different stages of a flight.

FIG. 8 is a graph showing the temperature of the oil ($T_{oil}$) and the temperature of the wall 320 ($T_{metal}$) through different stages of a flight. The wall 320 and, more specifically, the interior surface 322 (see FIG. 7) may be exposed to elevated temperatures during operation. Such elevated temperatures may include, for example, temperatures greater than three hundred fifty degrees Fahrenheit (350° F.). As noted above, the oil tube 300 is positioned within the core air flow path 121 and the temperature of the wall 320 thus follows the temperature of the air flowing though the core air flow path 121 (see FIG. 2). As can be seen in FIG. 8, the temperature of the wall 320 ($T_{metal}$) increases from ambient temperatures to a high temperature during start-up and take off and, when the temperature of the air flowing through the core air flow path 121 reduces during cruise, so does the temperature of the wall 320 ($T_{metal}$). Similarly, the temperature of the oil ($T_{oil}$) flowing through the flow passage 326 of the oil tube 300 also increases from ambient temperature to operating temperatures during start-up, take off, and cruise. As the oil is flowing through the oil tube 300, the oil temperature is impacted less by the temperature of the air flowing through the core air flow path 121 than other sources of heat within the engine 100.

Immediately after shutdown, so-called soak back heating occurs. At shutdown, the flow of the oil within the flow passage 326 (see FIG. 7) and against the interior surface 322 (see FIG. 7) is stagnated (or at least greatly reduced). In addition, the compressor bleed air 22 is not flowing to cool the service tube fairing 188 (see FIG. 5) and the wall 320 (see FIG. 7). At the same time, components such as the service tube assembly 186 (see FIG. 5) are still hot (e.g., near operating temperature). Accordingly, both the temperature of the oil and the wall 320 increase to temperatures above a coke formation temperature ($T_{coke}$). At these temperatures, the interior surface 322, which is exposed to the oil and made from the metals discussed above, may be susceptible to a significant build-up of coke. Under such conditions, coke can build up over time to a considerable thickness, restricting or even blocking the flow of the oil through the flow passage 326. As the components of the engine 100 release their heat to the environment, the oil tube 300 and oil in the oil tube 300 will begin to cool down.

The oil tubes 300 discussed herein are thermally activated and move or contort when subjected to the thermal cycling discussed above. As will be discussed in the embodiments below, various different shapes and constructions of the oil tube 300 may be used to achieve a sufficient level of movement and contortion under this thermal cycling to break up deposits of coke forming on the interior surface 322 (see FIG. 7). In some embodiments, the oil tube 300 includes a plurality of recesses and/or protrusions formed on the interior surface 322 and/or the exterior surface 324 (see FIG. 7). These recesses and protrusions help drive contortion of the oil tube 300 that will result in the coke deposits that have formed on the interior surface 322 breaking-up. The disrupted coke deposits can then be removed by the natural flow of the oil through the flow passage 326 (see FIG. 7), thus, avoiding the buildup of coke deposits. As noted above, this is referred to herein as a self-cleaning effect.

Figure 9:
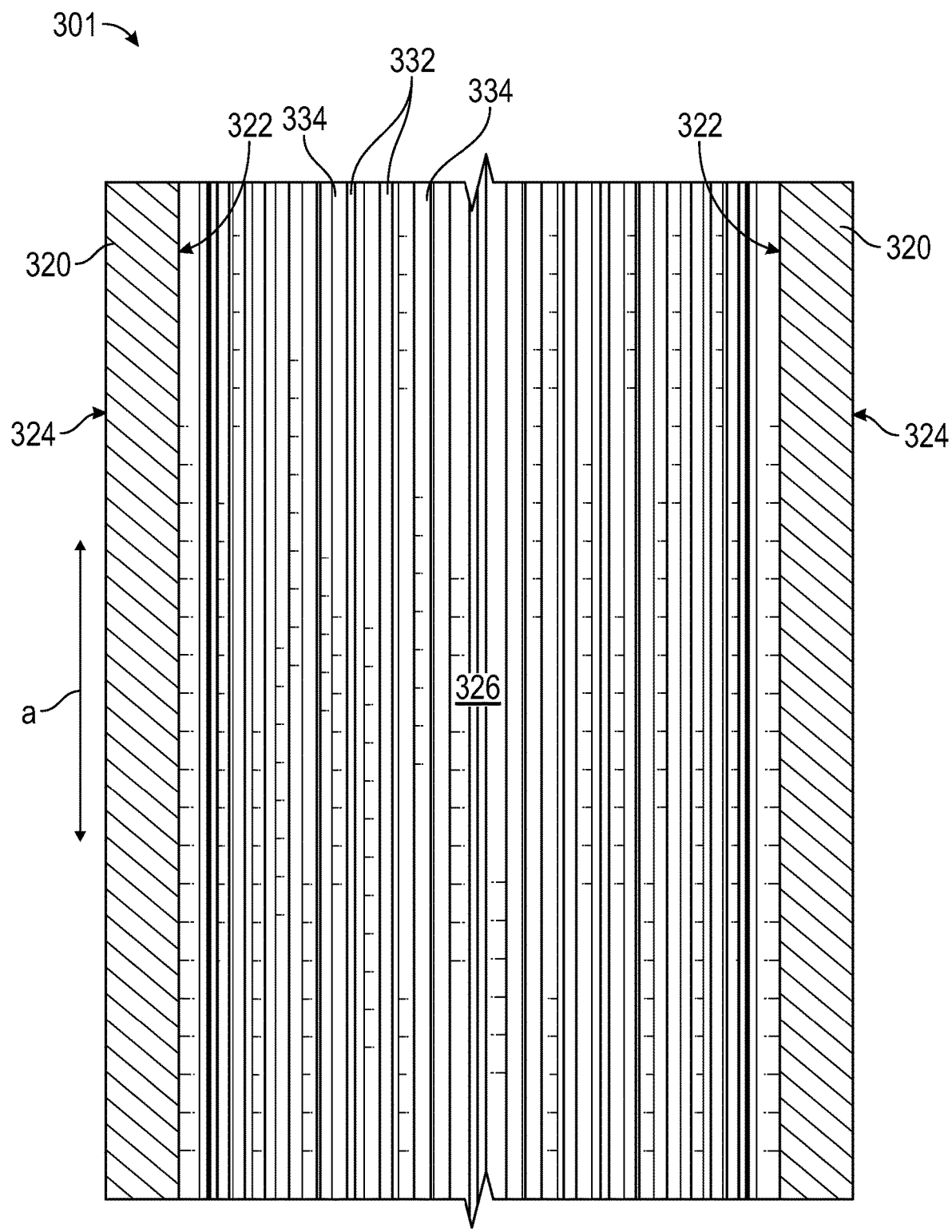
FIG. 9 is a cross-sectional view, taken along line 9-9 in FIG. 7, of the oil tube.

FIG. 9 shows an oil tube 301 according to a first embodiment. For clarity with the oil tubes described in the other embodiments, the oil tube 301 of this embodiment is referred to herein as an axial-ridge oil tube 301. FIG. 9 is a cross-sectional view, taken along line 9-9 in FIG. 7, of the axial-ridge oil tube 301, and FIG. 7 also shows the axial-ridge oil tube 301. The axial-ridge oil tube 301 of this embodiment includes a plurality of protrusions formed on the interior surface 322 of the axial-ridge oil tube 301. The protrusions of this embodiment are ridges (interior ridges 332) integrally formed in the wall 320, and the axial-ridge oil tube 301 thus includes a plurality of interior ridges 332. Each interior ridge 332 of the plurality of interior ridges 332 in this embodiment is parallel to the axial direction a of the axial-ridge oil tube 301. The axial-ridge oil tube 301 of this embodiment also includes a plurality of recesses formed on the interior surface 322 of the axial-ridge oil tube 301. In this embodiment, the recesses are grooves (interior grooves 334) between adjacent interior ridges 332 and thus are also parallel to the axial direction a of the axial-ridge oil tube 301.

As will be illustrated by some of the other embodiments below, the interior ridges 332 may have a wide variety of different shapes and sizes. For example, the interior ridges 332 can be thin, having a fin shape. Other suitable cross-sectional shapes of the interior ridges 332 include, for example, bell-shaped, triangular, rectangular, and semicircular. Likewise, the interior grooves 334 can also have a wide variety of different shapes and sizes. For example, the interior grooves 334 may be V-shaped, U-shaped, rectangular-shaped, or semicircular-shaped. The interior ridges 332 and interior grooves 334 may be spaced at various distances apart resulting in different protrusion (or recess) densities on the interior surface 322. Although continuous, rectilinear interior ridges 332 and interior grooves 334 are shown, the interior ridges 332 may have any suitable shape. For example, the interior ridges 332 and the interior grooves 334 may be curvilinear having, for example, parallel sinusoidal shapes. In another example, the interior ridges 332 may be discontinuous, being segmented with space between the segments of interior ridges 332.

The wall 320, including the interior ridges 332, of the axial-ridge oil tube 301 is made from a shape memory alloy (SMA). The wall 320 and the interior ridges 332 (protrusions) may be formed from one of a plurality of materials generally recognized to fall within the class of "shape memory alloys." In the applications discussed herein, the shape memory alloy is preferably a high-temperature shape memory alloy. One suitable high-temperature shape memory alloy is, for example, a nickel-titanium alloy known under the trade name Nitinol®. Other suitable shape memory alloys include, for example, cobalt-nickel-aluminum alloys, nickel-iron-gallium alloys, iron-manganese-gallium alloys, and cobalt-nickel-gallium alloys.

Shape memory alloys may undergo a phase change with changing (an increase or decrease) in temperature. Nitinol®, for example, may change between an austenitic phase and a martensitic phase. The temperature (or temperature range) at which this phase change occurs may be referred to as a transformation temperature. The shape memory alloy used to form the wall 320 and the interior ridges 332 (protrusions) preferably has a transformation temperature range appropriate for the thermal cycling of the axial-ridge oil tube 301 (oil tube 300), discussed above with respect to FIG. 8, and the axial-ridge oil tube 301 (oil tube 300) is configured to be exposed to thermal cycling passing through the transformation temperature range of the selected shape memory alloy. Many of the shape memory alloys discussed above, like Nitinol®, can be tuned to have a transformation temperature in the range from room temperature (e.g., twenty degrees Celsius (20° C.)) to one hundred degrees Celsius (100° C.). As the axial-ridge oil tube 301 increases in temperature during start up or decreases in temperature during cool down, for example, the wall 320 and the interior ridges 332 (protrusions) will pass through the transition temperature, and the shape memory alloy undergoes a phase change. With this phase change, the wall 320 and the interior ridges 332 (protrusions) will change shape and contort. For example, the axial-ridge oil tube 301 has an axial length, and the axial length may expand or contract as the axial-ridge oil tube 301 passes through the transition temperature. Likewise, the interior ridges 332 may expand or contract as the axial-ridge oil tube 301 passes through the transition temperature. With the phase change, this contortion of the wall 320 and the interior ridges 332 (protrusions) will break up the deposits that have formed on the interior surface 322.

Figure 10:
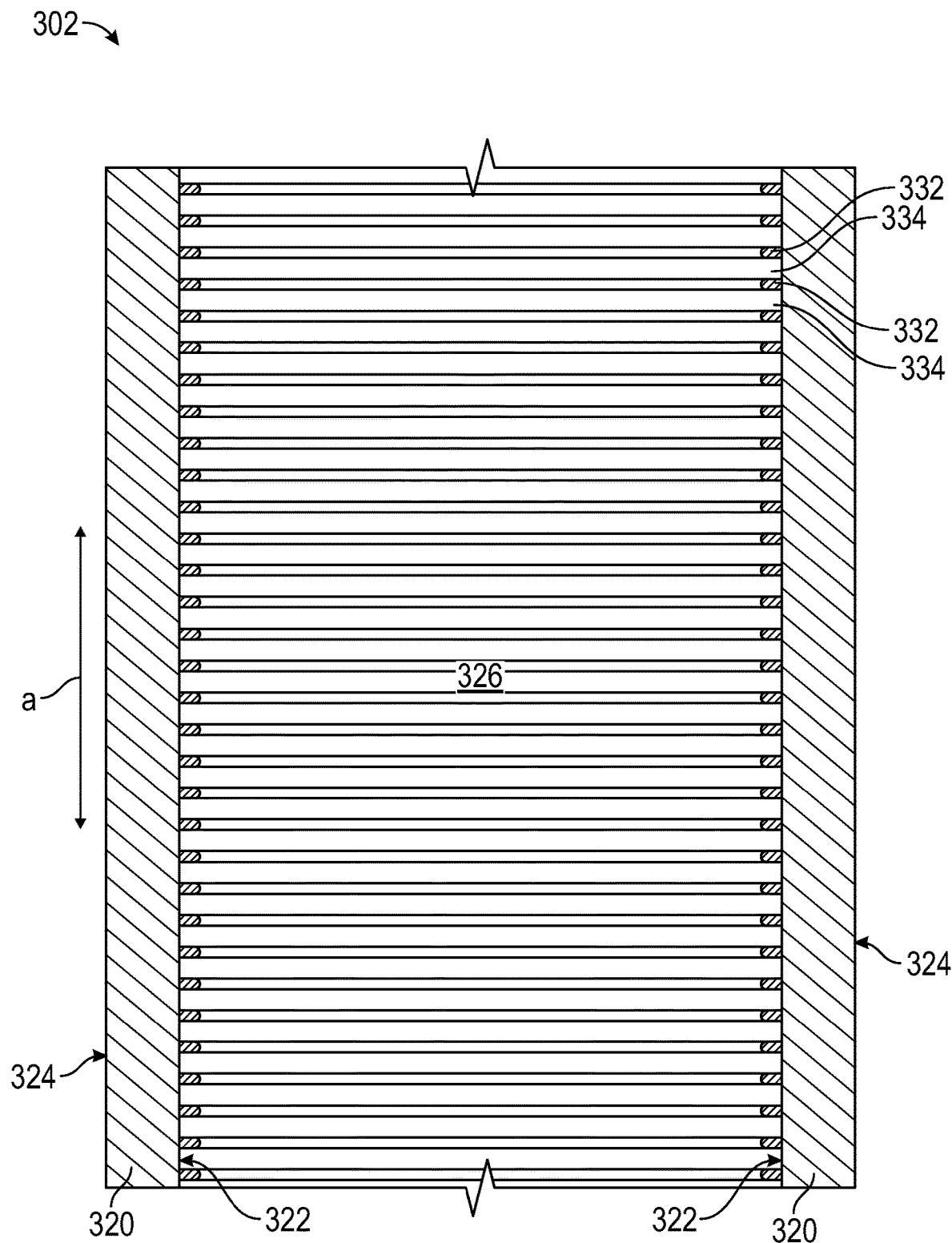
FIG. 10 is a cross-sectional view of an oil tube according to another embodiment.

FIG. 10 shows an oil tube 302 according to another embodiment. For clarity with the oil tubes described in the other embodiments, the oil tube 302 of this embodiment is referred to herein as a circumferential-ridge oil tube 302. FIG. 10 is a cross-sectional view of the circumferential-ridge oil tube 302. FIG. 10 has a perspective similar to that of the cross-sectional view taken along line 9-9 in FIG. 7. The circumferential-ridge oil tube 302 is similar to the axial-ridge oil tube 301 discussed above with reference to FIG. 9. The same reference numerals will be used for components of the circumferential-ridge oil tube 302 that are the same as or similar to the components of the axial-ridge oil tube 301 discussed above. The description of these components above also applies to this embodiment, and a detailed description of these components is omitted here. The circumferential-ridge oil tube 302 of this embodiment also includes a plurality of interior ridges 332 and interior grooves 334, but, in this embodiment, the interior ridges 332 and the interior grooves 334 are oriented in the circumferential direction c (see FIG. 7) of the circumferential-ridge oil tube 302.

Figure 11:
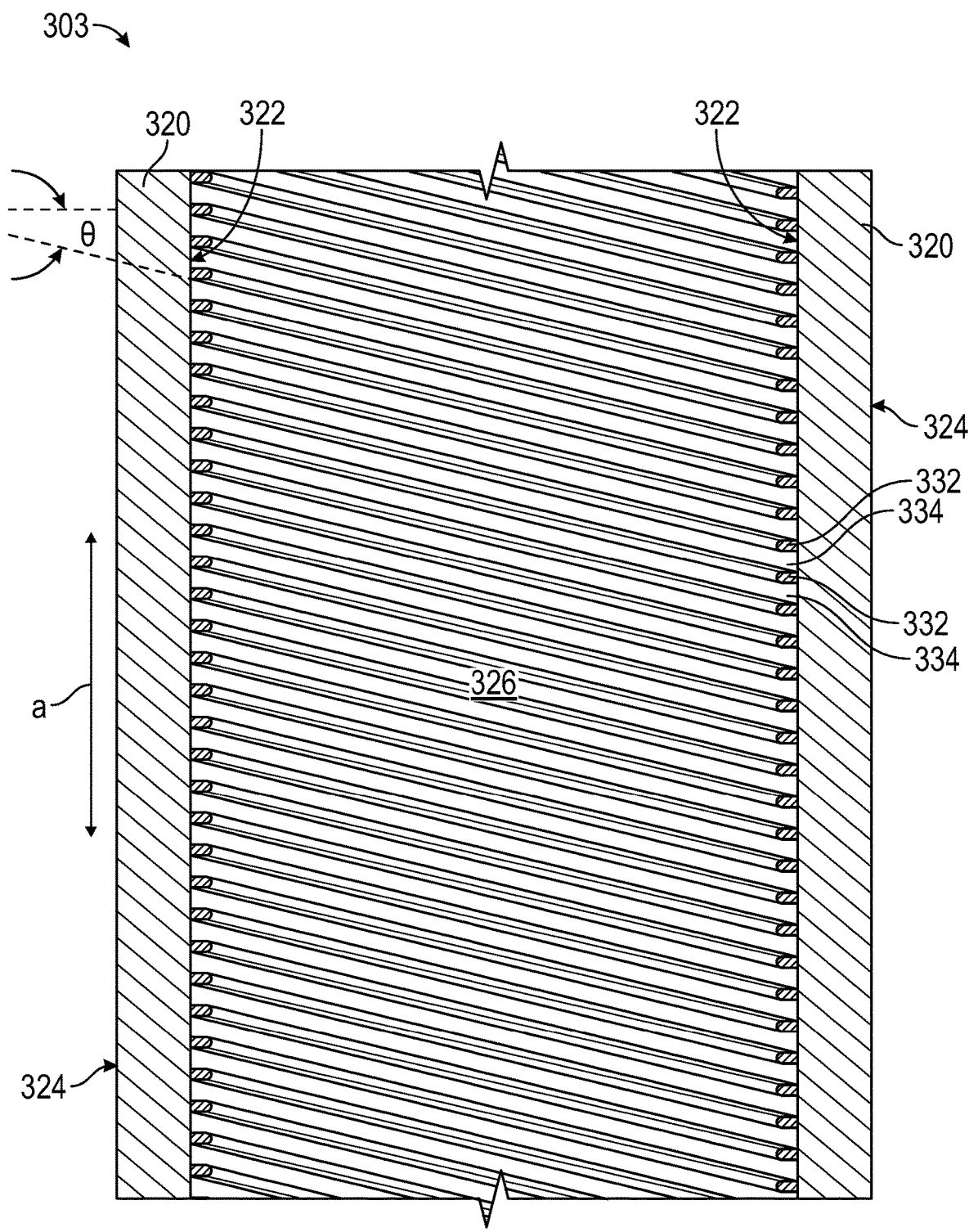
FIG. 11 is a cross-sectional view of an oil tube according to another embodiment.

FIG. 11 shows an oil tube 303 according to another embodiment. For clarity with the oil tubes described in the other embodiments, the oil tube 303 of this embodiment is referred to herein as a helical-ridge oil tube 303. FIG. 11 is a cross-sectional view of the helical-ridge oil tube 303. FIG. 11 has a perspective similar to that of the cross-sectional view taken along line 9-9 in FIG. 7. The helical-ridge oil tube 303 is similar to the axial-ridge oil tube 301 discussed above with reference to FIG. 9 and the circumferential-ridge oil tube 302 discussed above with reference to FIG. 10. The same reference numerals will be used for components of the helical-ridge oil tube 303 that are the same as or similar to the components of the axial-ridge oil tube 301 and the circumferential-ridge oil tube 302 discussed above. The description of these components above also applies to this embodiment, and a detailed description of these components is omitted here.

The helical-ridge oil tube 303 of this embodiment also includes a plurality of interior ridges 332 and interior grooves 334, but, in this embodiment, the interior ridges 332 and the interior grooves 334 are helical, having an angle θ relative to a circumferential plane perpendicular to the axial direction. The angle θ may be any suitable angle between zero degrees (0°) and ninety degrees (90°).

Figure 12:
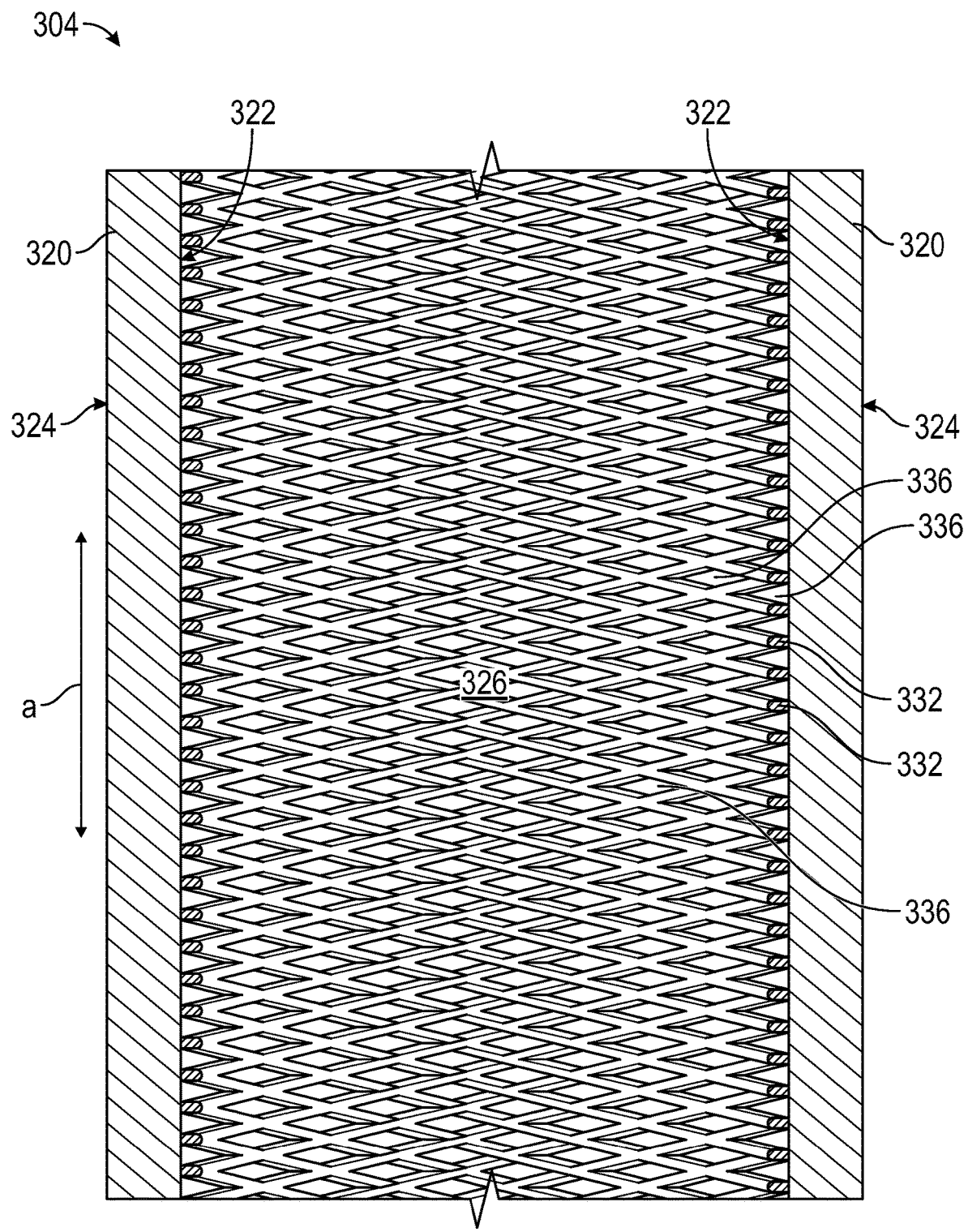
FIG. 12 is a cross-sectional view of an oil tube according to another embodiment.

FIG. 12 shows an oil tube 304 according to another embodiment. For clarity with the oil tubes described in the other embodiments, the oil tube 303 of this embodiment is referred to herein as a cross-ridge oil tube 304. FIG. 12 is a cross-sectional view of the cross-ridge oil tube 304. FIG. 12 has a perspective similar to that of the cross-sectional view taken along line 9-9 in FIG. 7. The helical-ridge oil tube 303 is similar to the axial-ridge oil tube 301 discussed above with reference to FIG. 9, the circumferential-ridge oil tube 302 discussed above with reference to FIG. 10, and the helical-ridge oil tube 303 discussed above with reference to FIG. 11. The same reference numerals will be used for components of the cross-ridge oil tube 304 that are the same as or similar to the components of the axial-ridge oil tube 301, the circumferential-ridge oil tube 302, and the helical-ridge oil tube 303 discussed above. The description of these components above also applies to this embodiment, and a detailed description of these components is omitted here.

The cross-ridge oil tube 304 of this embodiment also includes a plurality of interior ridges 332, but, in this embodiment, the interior ridges 332 have a double helical or a cross pattern creating a lattice structure, resulting in diamond-shaped recesses 336. Although the lattice structure depicted in FIG. 12 is a criss-cross arrangement forming the diamond-shaped recesses 336, any suitable pattern may be used.

Figures 13A, 13B:
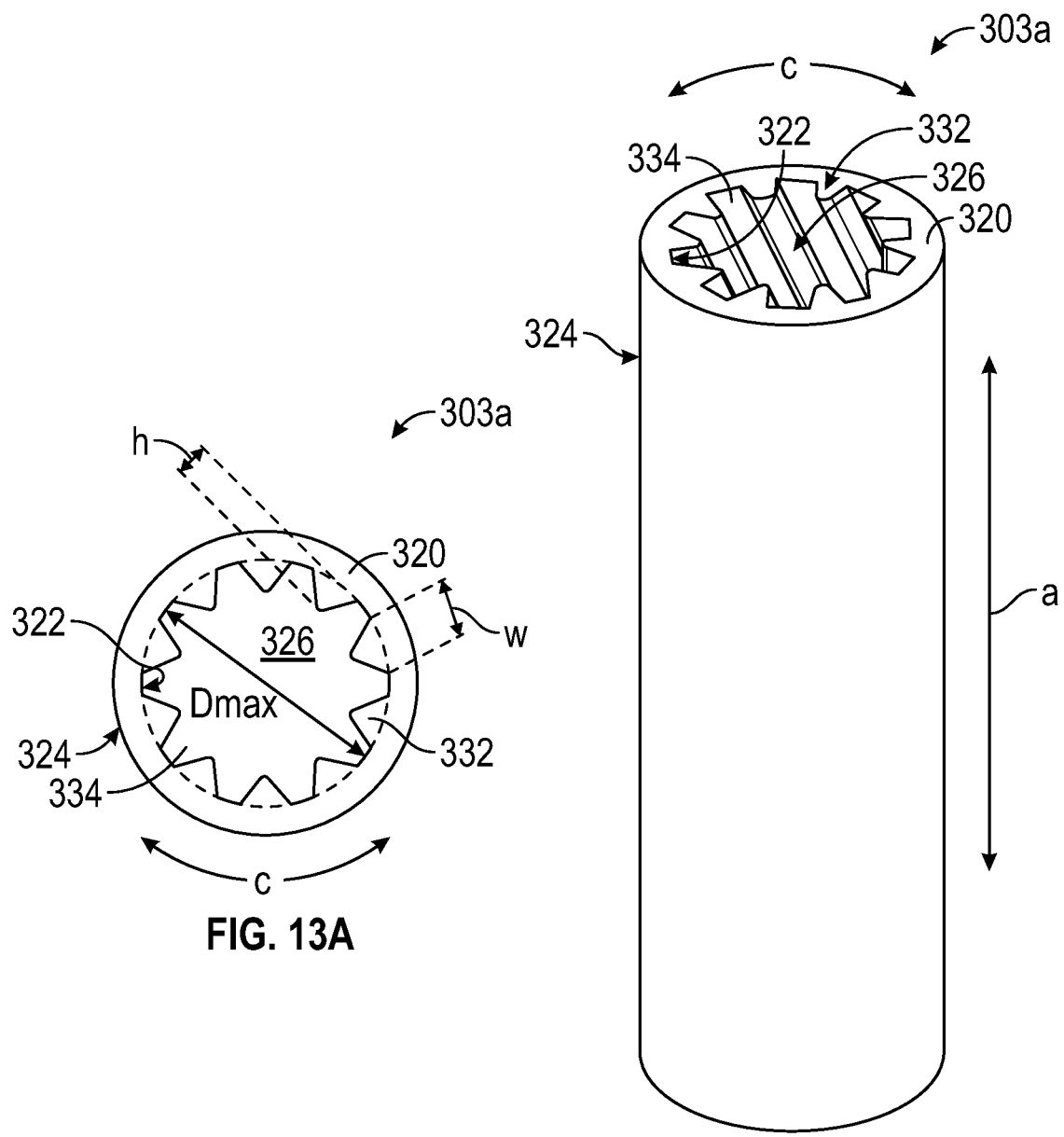
FIGS. 13A and 13B show an oil tube according to another embodiment.

FIGS. 13A and 13B show an oil tube 303a according to another embodiment. For clarity with the oil tubes described in the other embodiments, the oil tube 303a of this embodiment is referred to herein as a large-helical-ridge oil tube 303a. FIG. 13A is an axial view of the large-helical-ridge oil tube 303a, and FIG. 13B shows the top and the side of the large-helical-ridge oil tube 303a. The large-helical-ridge oil tube 303a is similar to the helical-ridge oil tube 303 discussed above with reference to FIG. 11. The same reference numerals will be used for components of the large-helical-ridge oil tube 303a that are the same as or similar to the components of the helical-ridge oil tube 303 discussed above. The description of these components above also applies to this embodiment, and a detailed description of these components is omitted here.

FIGS. 13A and 13B depict a variation of the helical-ridge oil tube 303. The large-helical-ridge oil tube 303a includes a plurality of triangular shaped helical interior ridges 332 formed on the interior surface 322. Each interior ridge 332 has a height h and a width w. The interior ridges 332 of this embodiment are spaced uniformly in the circumferential direction c and thus have a density (number) of interior ridges 332.

Figure 14A:
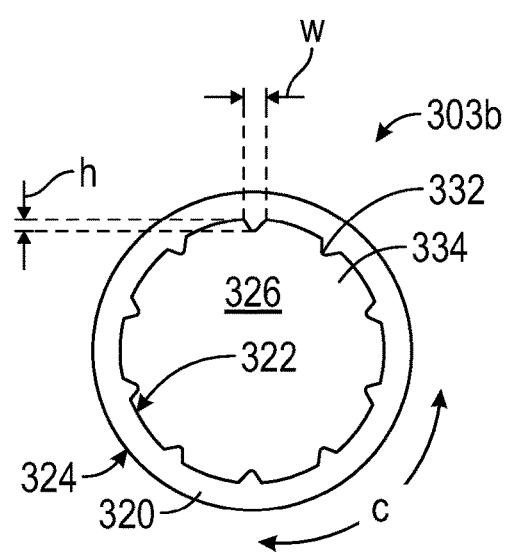
FIGS. 14A and 14B show an oil tube according to another embodiment.
Figure 14B:
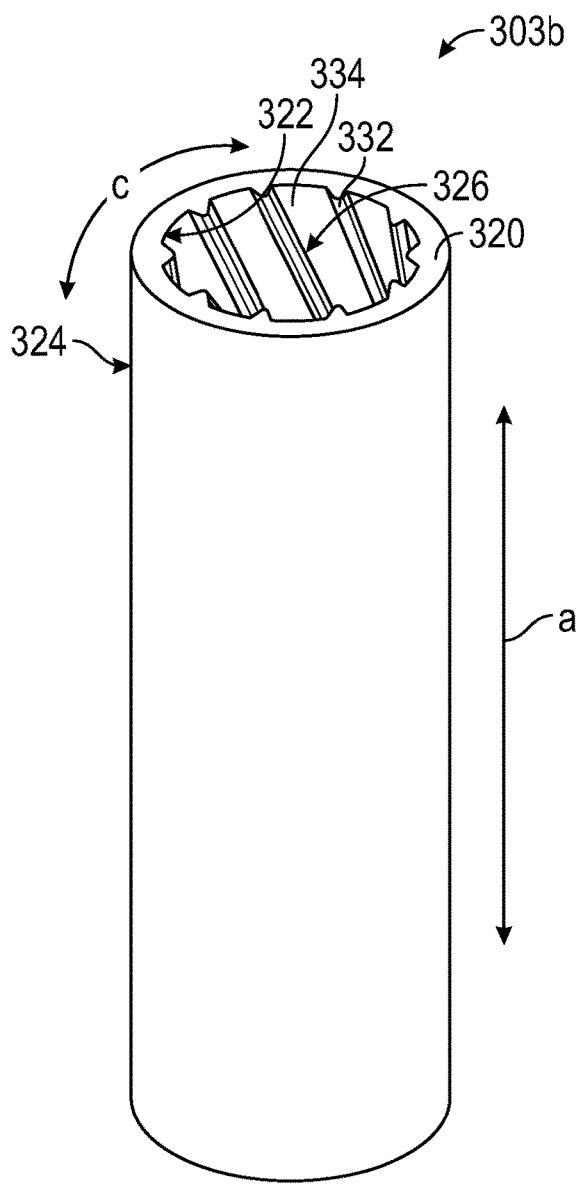

FIGS. 14A and 14B show an oil tube 303b according to another embodiment. For clarity with the oil tubes described in the other embodiments, the oil tube 303b of this embodiment is referred to herein as a small-helical-ridge oil tube 303b. FIG. 14A is an axial view of the small-helical-ridge oil tube 303b, and FIG. 14B shows the top and side of the small-helical-ridge oil tube 303b. The small-helical-ridge oil tube 303b is similar to the helical-ridge oil tube 303 discussed above with reference to FIG. 11 and the large-helical-ridge oil tube 303a discussed above with reference to FIGS. 13A and 13B. The same reference numerals will be used for components of the small-helical-ridge oil tube 303b that are the same as or similar to the components of the helical-ridge oil tube 303 and the large-helical-ridge oil tube 303a discussed above. The description of these components above also applies to this embodiment, and a detailed description of these components is omitted here.

FIGS. 14A and 14B depict a variation of the helical-ridge oil tube 303. The small-helical-ridge oil tube 303b includes a plurality of triangular shaped helical interior ridges 332 formed on the interior surface 322, just as the large-helical-ridge oil tube 303a. The small-helical-ridge oil tube 303b has the same density of interior ridges 332 as the large-helical-ridge oil tube 303a, but the height h and width w of each interior ridge 332 is smaller than the height h and width w of each interior ridge 332 of the large-helical-ridge oil tube 303a. These differences result in different stiffnesses and contortions for the large-helical-ridge oil tube 303a and the small-helical-ridge oil tube 303b when subjected to the thermal cycling discussed above. The large-helical-ridge oil tube 303a would be expected to have greater contortions (movement) than the small-helical-ridge oil tube 303b when otherwise exposed to the same conditions.

Figures 15A, 15B:
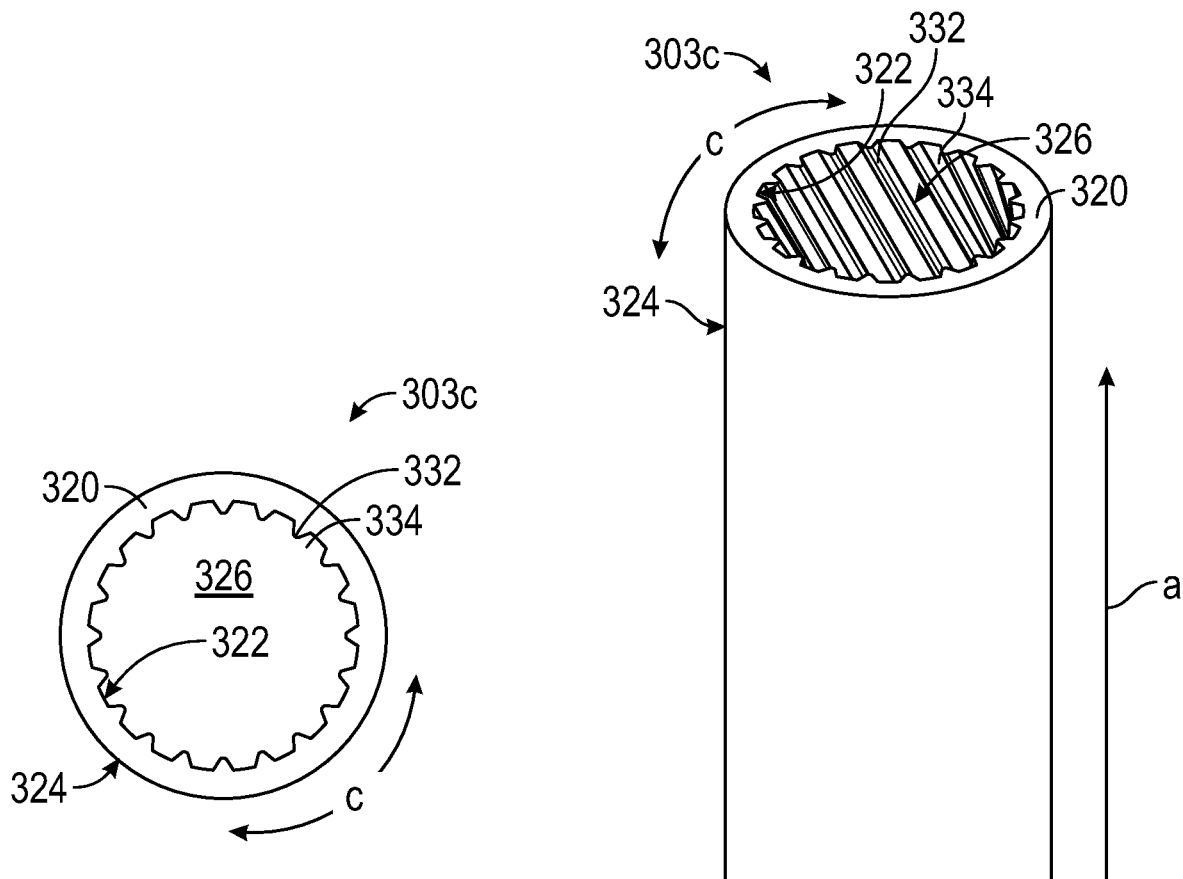
FIGS. 15A and 15B show an oil tube according to another embodiment.

FIGS. 15A and 15B show an oil tube 303c according to another embodiment. For clarity with the oil tubes described in the other embodiments, the oil tube 303c of this embodiment is referred to herein as a dense-helical-ridge oil tube 303c. FIG. 15A is an axial view of the dense-helical-ridge oil tube 303c, and FIG. 15B shows the top and side of the dense-helical-ridge oil tube 303c. The dense-helical-ridge oil tube 303c is similar to the helical-ridge oil tube 303 discussed above with reference to FIG. 11, the large-helical-ridge oil tube 303a discussed above with reference to FIGS. 13A and 13B, and the small-helical-ridge oil tube 303b discussed above with reference to FIGS. 14A and 14B. The same reference numerals will be used for components of the dense-helical-ridge oil tube 303c that are the same as or similar to the components of the helical-ridge oil tube 303, the large-helical-ridge oil tube 303a, and the small-helical-ridge oil tube 303b discussed above. The description of these components above also applies to this embodiment, and a detailed description of these components is omitted here.

FIGS. 15A and 15B depict a variation of the helical-ridge oil tube 303. The dense-helical-ridge oil tube 303c includes a plurality of triangular shaped helical interior ridges 332 formed on the interior surface 322, just as the small-helical-ridge oil tube 303b. The interior ridges 332 of the small-helical-ridge oil tube 303b and the dense-helical-ridge oil tube 303c are the same, but the interior ridges 332 of the dense-helical-ridge oil tube 303c are spaced closer together in the circumferential direction c than the interior ridges 332 of the small-helical-ridge oil tube 303b resulting in a greater number and density of interior ridges 332. This density difference of interior ridges 332 also results in different stiffnesses and contortions for the small-helical-ridge oil tube 303b and the dense-helical-ridge oil tube 303c when subjected to the thermal cycling discussed above.

Figure 16A:
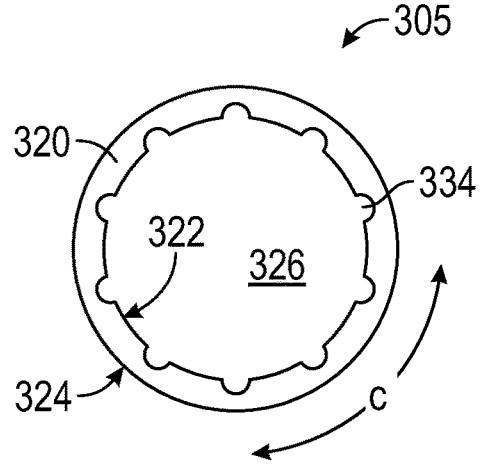
FIGS. 16A and 16B show an oil tube according to another embodiment.
Figure 16B:
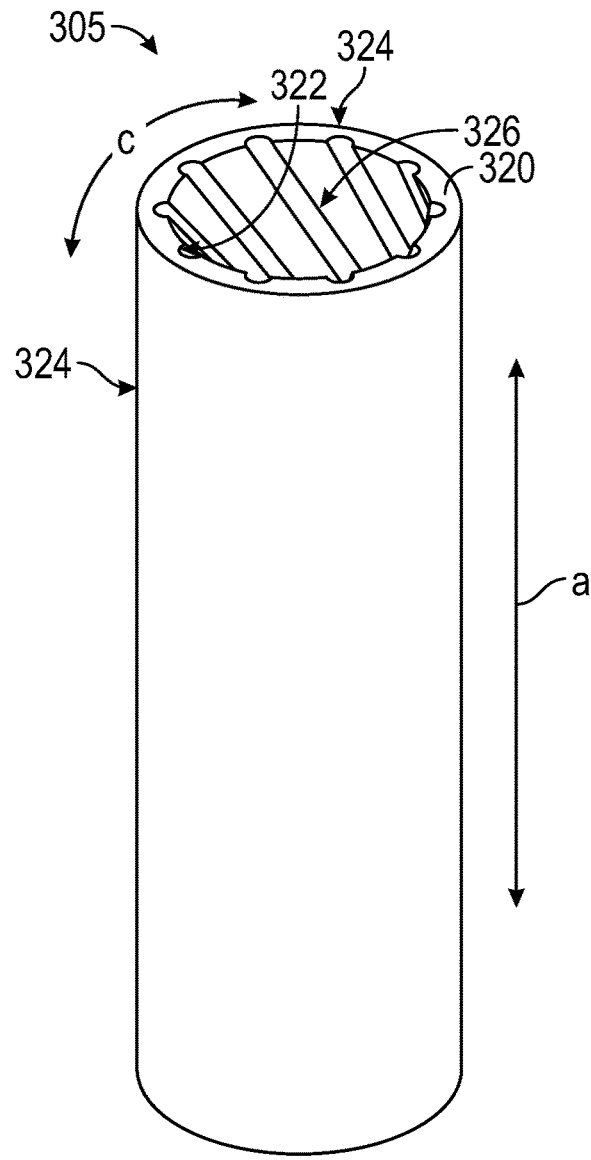

FIGS. 16A and 16B show an oil tube 305 according to another embodiment. For clarity with the oil tubes described in the other embodiments, the oil tube 305 of this embodiment is referred to herein as a helical-groove oil tube 305. FIG. 16A is an axial view of the helical-groove oil tube 305, and FIG. 16B shows the top and the side of the helical-groove oil tube 305. The helical-groove oil tube 305 is similar to the small-helical-ridge oil tube 303b discussed above with reference to FIGS. 14A and 14B. The same reference numerals will be used for components of the helical-groove oil tube 305 that are the same as or similar to the components of the small-helical-ridge oil tube 303b (or helical-ridge oil tube 303) discussed above. The description of these components above also applies to this embodiment, and a detailed description of these components is omitted here.

The helical-groove oil tube 305 of this embodiment includes a plurality of helical grooves 334 spaced in the circumferential direction c of the helical-groove oil tube 305. The interior grooves 334 of this embodiment have the same density as the interior ridges 332 of the small-helical-ridge oil tube 303b discussed above. Because interior grooves 334 are used instead of the interior ridges 332, the helical-groove oil tube 305 of this embodiment will also result in different stiffnesses and contortions for the helical-groove oil tube 305 and the small-helical-ridge oil tube 303b when subjected to the thermal cycling discussed above.

Figures 17A, 17B:
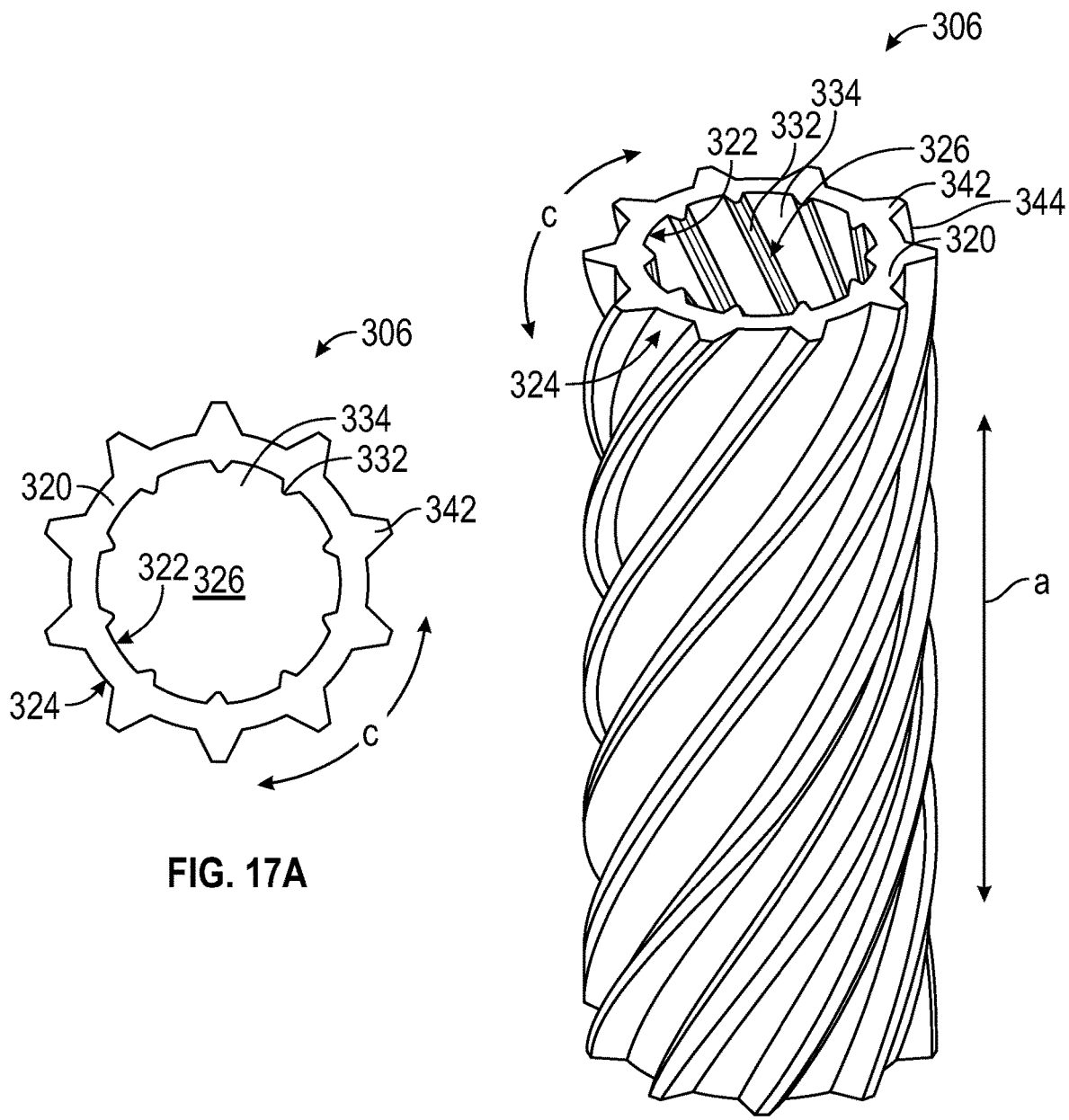
FIGS. 17A and 17B show an oil tube according to another embodiment.

FIGS. 17A and 17B show an oil tube 306 according to another embodiment. For clarity with the oil tubes described in the other embodiments, the oil tube 306 of this embodiment is referred to herein as an exterior-finned oil tube 306. FIG. 17A is an axial view of the exterior-finned oil tube 306, and FIG. 17B shows the top and side of the exterior-finned oil tube 306. The exterior-finned oil tube 306 is similar to the small-helical-ridge oil tube 303b discussed above with reference to FIGS. 14A and 14B. The same reference numerals will be used for components of the exterior-grooved oil tube 307 that are the same as or similar to the components of the small-helical-ridge oil tube 303b discussed above. The description of these components above also applies to this embodiment, and a detailed description of these components is omitted here.

In the embodiments discussed above, the oil tubes 300 have a smooth exterior surface 324. The exterior-finned oil tube 306 of this embodiment includes a plurality of ridges (exterior ridges 342) formed on the exterior surface 324. In this embodiment, the exterior ridges 342 are helical, but any suitable orientation and shape may be used for the exterior ridges 342. The same considerations discussed above for the interior ridges 332 formed on the interior surface 322 may also apply to the exterior ridges 342. Adding the exterior ridges 342 to the exterior-finned oil tube 306 also results in different stiffnesses and contortions for the exterior-finned oil tube 306 than the other oil tubes discussed herein when subjected to the thermal cycling discussed above.

Figures 18A, 18B:
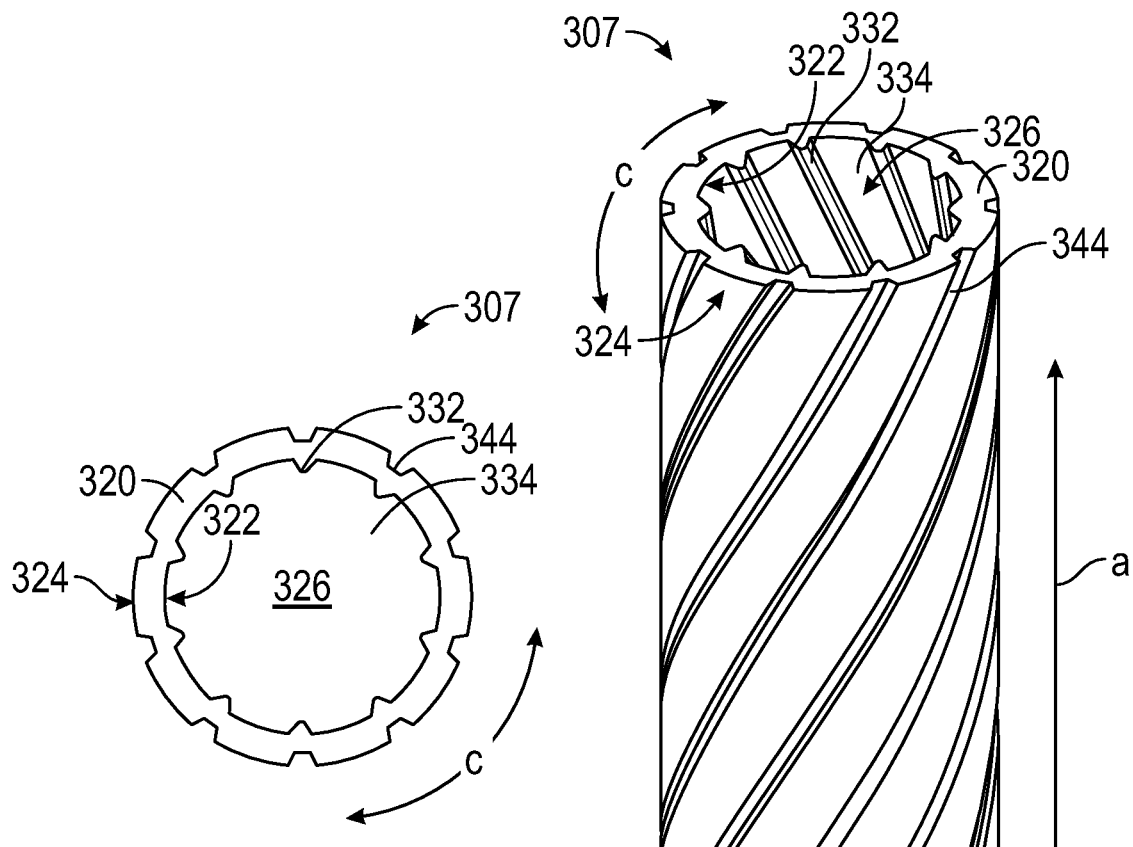
FIGS. 18A and 18B show an oil tube according to another embodiment.

FIGS. 18A and 18B show an oil tube 307 according to another embodiment. For clarity with the oil tubes described in the other embodiments, the oil tube 307 of this embodiment is referred to herein as an exterior-grooved oil tube 307. FIG. 18A is an axial view of the exterior-grooved oil tube 307, and FIG. 18B shows the top and side of the exterior-grooved oil tube 307. The exterior-grooved oil tube 307 is similar to the small-helical-ridge oil tube 303b discussed above with reference to FIGS. 14A and 14B. The same reference numerals will be used for components of the exterior-grooved oil tube 307 that are the same as or similar to the components of the small-helical-ridge oil tube 303b discussed above. The description of these components above also applies to this embodiment, and a detailed description of these components is omitted here.

In the embodiments discussed with reference to FIGS. 17A and 17B, the exterior-finned oil tube 306 includes exterior ridges 342 formed on the exterior surface 324, but, in this embodiment, the exterior-grooved oil tube 307 includes a plurality of grooves (exterior grooves 344) formed on the exterior surface 324. In this embodiment, the exterior grooves 344 are helical, but any suitable orientation and shape may be used for the interior grooves 334. The same considerations discussed above for the interior grooves 334 formed on the interior surface 322 may also apply to the exterior grooves 344. Adding the exterior grooves 344 also results in different stiffnesses and contortions for the exterior-grooved oil tube 307 than the other oil tubes discussed herein when subjected to the thermal cycling discussed above.

Figure 19A:
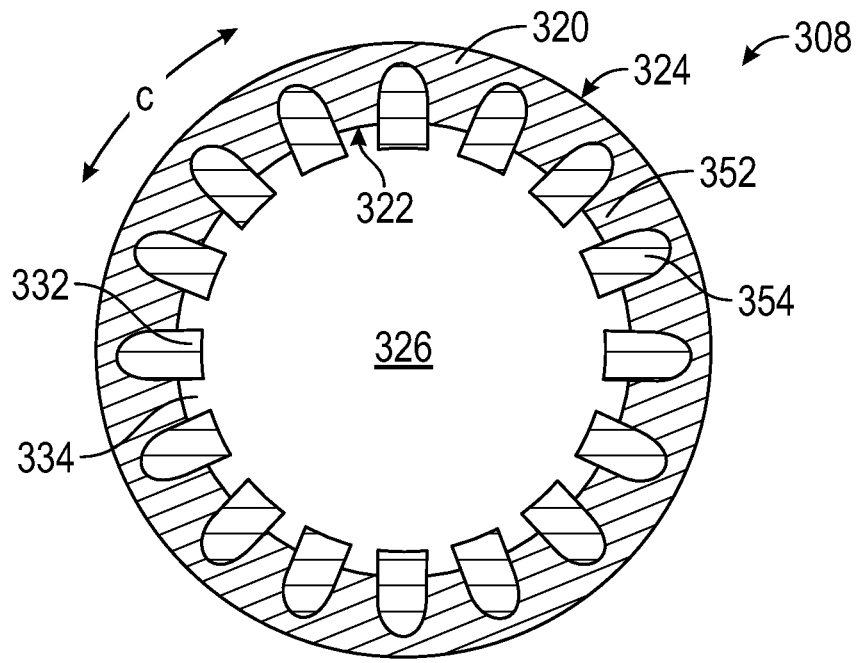
FIGS. 19A and 19B are axial cross-sectional views of an oil tube according to another embodiment.
Figure 19B:
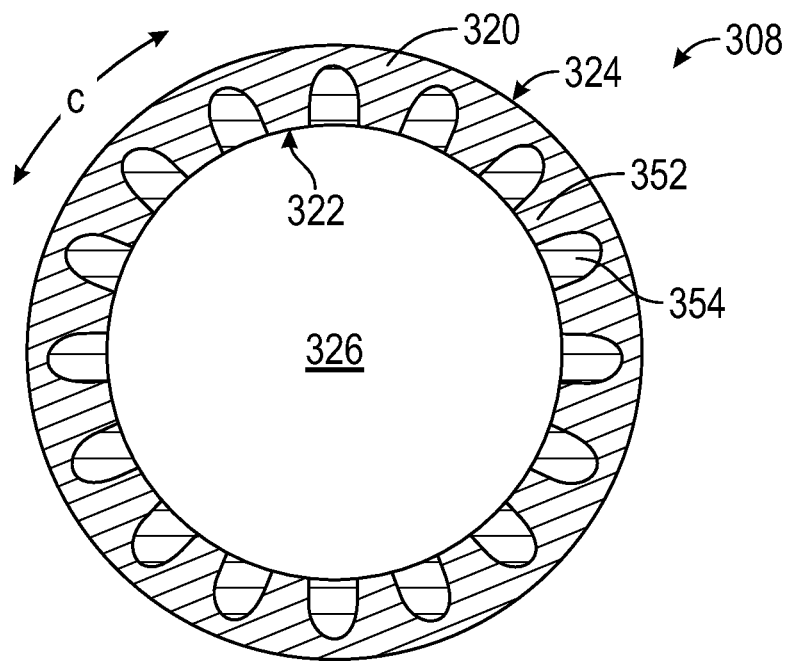

FIGS. 19A and 19B are axial cross-sectional views of an oil tube 308 according to another embodiment. For clarity with the oil tubes described in the other embodiments, the oil tube 308 of this embodiment is referred to herein as an axial-bimetal oil tube 308. The axial-bimetal oil tube 308 is similar to the various oil tubes discussed above. The same reference numerals will be used for components of the axial-bimetal oil tube 308 that are the same as or similar to the components of the oil tubes discussed above. The description of these components above also applies to this embodiment, and a detailed description of these components is omitted here.

In the embodiments discussed above, the oil tubes were formed from a shape memory alloy. Bi-metallic couples can also be constructed to deform, to move, and otherwise to contort under the thermal cycling conditions discussed above. The axial-bimetal oil tube 308 of this embodiment is formed from two metals having different coefficients of thermal expansion. In the embodiment shown in FIGS. 19A and 19B, the axial-bimetal oil tube 308 includes a plurality of first strips 352 and a plurality of second strips 354. Each of the first strips 352 is formed from a first metal, and each of the second strips 354 is formed from a second metal. The thermal expansion coefficient and, more specifically, the linear thermal expansion coefficient $\alpha_1$ of the first metal (first strips 352) is different from the thermal expansion coefficient and, more specifically, the linear thermal expansion coefficient $\alpha_2$ of the second metal (second strips 354). The difference between the linear thermal expansion coefficient $\alpha_1$ of the first metal (first strips 352) and the linear thermal expansion coefficient $\alpha_2$ of the second metal (second strips 354) is preferably at least fifteen percent (15%) and more preferably at least thirty percent (30%) to drive movement of the axial-bimetal oil tube 308. Metals that may be used as the first metal in the first strips 352 and the second metal in the second strips 354 for the applications discussed herein include, for example, steels, such as stainless steels, titanium, titanium alloys, nickel and nickel alloys such as Inconel©, RENE™, and Hastalloy™.

The first strips 352 and the second strips 354 of this embodiment are parallel to the axial direction a (see FIG. 9) of the axial-bimetal oil tube 308. The first strips 352 and the second strips 354 are arranged in an alternating manner with one first strip 352 being adjacent to one or more second strips 354 and one second strip 354 being adjacent to one or more first strips 352. The first strips 352 and the second strips 354 are thus parallel to each other. FIG. 19A shows the as assembled, low-temperature condition. In this embodiment, the first strips 352 and the second strips 354 are arranged to form interior ridges 332 and interior grooves 334. When subjected to the thermal cycling discussed above, the adjacent first strips 352 and the second strips 354 change dimensions at different rates resulting in movement and contortion of the axial-bimetal oil tube 308 and, particularly, the interior surface 322. With this movement, coke deposits that have formed on the interior surface 322 are broken up, and the disrupted coke deposits can then be removed by the natural flow of the oil through the flow passage 326. FIG. 19B shows the high-temperature (operational) condition of the axial-bimetal oil tube 308. In this embodiment, the first strips 352 and the second strips 354 have been sized such that during operation of the engine 100 the interior surface 322 is a smooth surface. The first strips 352 and the second strips 354 may be tuned, however, to have other arrangements, such as the smooth surface during room temperature conditions or interior ridges 332 and interior grooves 334 during all operating temperatures.

FIGS. 20A and 20B show an oil tube 309 according to another embodiment. For clarity with the oil tubes described in the other embodiments, the oil tube 309 of this embodiment is referred to herein as a circumferential-bimetal oil tube 309. FIGS. 20A and 20B are cross-sectional views of the circumferential-bimetal oil tube 309. FIGS. 20A and 20B each has a perspective similar to that of the cross-sectional view taken along line 9-9 in FIG. 7. The circumferential-bimetal oil tube 309 is similar to the axial-bimetal oil tube 308 discussed above with reference to FIGS. 19A and 19B. The same reference numerals will be used for components of the circumferential-bimetal oil tube 309 that are the same as or similar to the components of the axial-bimetal oil tube 308 discussed above. The description of these components above also applies to this embodiment, and a detailed description of these components is omitted here.

When bimetallic strips are used, any suitable arrangement of the first strips 352 and the second strips 354 may be used. In the embodiment shown in FIGS. 20A and 20B, for example, the first strips 352 and the second strips 354 are arranged parallel to each other in the circumferential direction c. FIG. 20A shows the as assembled, low-temperature condition, and FIG. 20B shows the high-temperature (operational) condition.

The first strips 352 and the second strips 354 may have other arrangements beyond those shown and described with reference to FIGS. 19A to 20B. The first strips 352 and the second strips 354 may be arranged in manners similar to those discussed above for the interior ridges 332 and the interior grooves 334. In addition, the axial-bimetal oil tube 308 and the circumferential-bimetal oil tube 309 may have additional interior ridges 332 and interior grooves 334 formed on the interior surface 322 and/or exterior ridges 342 and exterior grooves 344 formed on the exterior surface 324. These interior ridges 332 (or exterior ridges 342) and interior grooves 334 (or exterior grooves 344) may be bimetallic couples (strips) themselves.

Different variations of the oil tube 300 formed from a shape memory alloy or bi-metals are possible, provided the resultant oil tube 300 satisfies certain criteria described below. As discussed with reference to FIGS. 9 to 20B, the oil tube 300 may have many different geometries and, in particular, different sizes, shapes, arrangements, and densities of the interior ridges 332 and the interior grooves 334. Different shape memory alloys or different combinations of metals also can be used. Selecting the right combination of these features for a particular application is critical. Otherwise, the oil tube 300 may not have a sufficient range of movement for a given application to disrupt the coke formation.

During the course of evaluating the variations possible in the design, including the effectiveness and reliability or efficiency in removing or mitigating coke, the inventors, discovered, unexpectedly, that there exists two relationships among select features of the oil tube 300, and the working temperatures of the oil that produced superior results over the other numerous other designs considered. These two relationships are similar and are both referred to by the inventors as the conduit contortion factor (CCF) for lube oil coke cleaning. The first relationship is defined according to relationship (1) and is referred to herein as an elastic conduit contortion factor ($CCF_E$), and the second relationship is defined according to the relationship (2) and is referred to herein as a thermal expansion conduit contortion factor (CCF$_{TE}$). In embodiments herein, the oil tube 300 is characterized by a conduit contortion factor (CCF) where the conduit contortion factor (CCF) is one of the elastic conduit contortion factor (CCF$_E$) and the thermal expansion conduit contortion factor (CCF$_{TE}$).

CCF$_E$ is a factor having units in terms of temperature (e.g., degrees Fahrenheit) defined according to the following relationship (1):

$$\text{Conduit Contortion Factor } (CCF_E) = \left| \frac{D_h - D'_h}{D_h} \right| \times T_{oil} \times \frac{\Delta H}{H} \times \frac{E_2}{E_1} \quad (1)$$

The first factor of the CCF$_E$, as shown in relationship (1), is referred to herein as the hydraulic diameter ratio ($D_h-D'_h/D_h$). As discussed in the embodiments above, the interior surface 322 of the oil tube 300 includes at least one of recesses (interior grooves 334) or protrusions (interior ridges 332) and, in some embodiments, may have both. Such recesses and protrusions are helpful in disrupting the coke formation during the thermal cycling discussed above. The first factor accounts for these features, such as the interior ridges 332, for example. The interior ridges 332 changes the hydraulic diameter of the flow passage 326 as compared to an oil tube having a smooth interior surface 322. An oil tube having a smooth interior surface 322 is used as a reference, and this reference tube is the oil tube 300 if recesses or protrusions were not formed on the interior surface 322, but instead had a smooth surface.

The hydraulic diameter (D$_h$) of the oil tube 300, if recesses or protrusions are not formed on the interior surface 322, is referred to herein as the standard hydraulic diameter (D$_h$). In calculating the standard hydraulic diameter (D$_h$), the maximum dimension of the flow passage 326 is used. As shown in FIG. 13A, for example, the oil tube 303a is circular and the maximum diameter is a maximum diameter d$_{max}$ within the flow passage 326. The standard hydraulic diameter (D$_h$) can then be calculated as the hydraulic diameter of a circle with a diameter of d$_{max}$. For many applications of the oil tube, and, particularly those discussed herein, the standard hydraulic diameter (D$_h$) will often be calculated using a circle or an ellipse with the maximum diameter(s) being determined accordingly. When a bimetal oil tube 300 (e.g., the axial-bimetal oil tube 308 and the circumferential-bimetal oil tube 309) having an operational temperature condition with a smooth interior surface 322 is used, the standard hydraulic diameter (D$_h$) is taken at the operational condition where there are no interior ridges 332 and interior grooves 334.

In calculating the hydraulic diameter ratio, the hydraulic diameter (D$_h$') of the oil tube 300 (with interior ridges 332, for example) is subtracted from the standard hydraulic diameter (D$_h$). This difference is then divided by the standard hydraulic diameter (D$_h$), resulting in the hydraulic diameter ratio. The absolute value of the hydraulic diameter ratio is used to calculate the CCF$_E$.

The second factor of the CCF$_E$, as shown in relationship (1), is referred to herein as a working temperature (T$_{oil}$). The working temperature is the temperature of the hydrocarbon fluid flowing through the flow passage 326, which in the example embodiments discussed herein is oil (T$_{oil}$). The temperature of the oil (T$_{oil}$) is taken as the maximum expected normal operating temperatures of the oil at the interior surface 322 of the oil tube 300.

The third factor of the CCF$_E$, as shown in relationship (1), is referred to herein as a deformation factor ($\Delta H/H$). The oil tube 300 has an initial shape including an axial length and a diameter in the as assembled state. A position on the oil tube 300, such as a portion of the interior ridges 332, also has an initial angular position. This initial axial length, initial diameter, or initial angular position is taken as the initial shape (H). The length, the diameter, and/or the angular position of the oil tube 300 will change under the thermal cycling conditions discussed above. The angular position changes by, for example, the interior surface 322 twisting. The change in the length, the diameter or the angular position is referred to herein as the change in shape $\Delta H$. The deformation factor is the change in shape ($\Delta H$) divided by the initial shape (H), such as the change in length divided by the initial length or the change in diameter divided by the initial diameter or the change in angular position divided by the initial angular position. The inventors unexpectedly found that that the quantity ($\Delta H/H$) could be based on any of the angle, length or diameter of the tube when computing the Conduit Contortion Factor (CCF$_E$) and Conduit Contortion Factor (CCF$_{TE}$) with the desired results The fourth factor of the CCF$_E$, as shown in relationship (1), is referred to herein as an elastic modulus ratio (E$_2$/E$_1$). As noted above, the oil tube 300 may be formed from a shape memory alloy. Such shape memory alloys have two phases, one at room temperature and another at phase above the transformation temperature. Each phase has an elastic modulus and, more specifically, a Young's modulus. The stiffness ratio (E$_2$/E$_1$) is the ratio of the elastic modulus of the low-temperature phase to the elastic modulus of the high-temperature phase and, more specifically, the ratio of the Young's modulus (E$_2$) of the low-temperature phase to the Young's modulus (E$_1$) of the high-temperature phase. For example, in some shape memory alloys, the room temperature phase is martensite, and the high-temperature phase (above the transformation temperature) is austenite, and thus the stiffness ratio (E$_m$/E$_a$) is the ratio of the elastic modulus of martensitic phase to the elastic modulus of the austenitic phase and, more specifically, the ratio of the Young's modulus (E$_m$) of the low martensitic phase to the Young's modulus (E$_a$) of the austenitic phase. To the extent there is a temperature dependency of the Young's modulus (elastic modulus), the Young's modulus (E$_2$) of the low-temperature phase is taken in the as assembled condition, such as at room temperature, and the Young's modulus (E$_1$) of the high-temperature phase is taken at the temperature of the oil (T$_{oil}$).

As noted above, the oil tube 300 also may be bimetallic, having a first metal (first strips 352) and a second metal (second strips 354). The stiffness ratio (E$_2$/E$_1$) is the ratio of the elastic modulus of the second metal (second strips 354) to the elastic modulus of the first metal (first strips 352) and, more specifically, the ratio of the Young's modulus (E$_2$) of the second metal (second strips 354) to the Young's modulus (E$_1$) of the first metal (first strips 352). The first metal being the one of the first metal and the second metal that has the higher elastic modulus and, more specifically, the higher Young's modulus. To the extent there is a temperature dependency of the Young's modulus (elastic modulus), the Young's modulus (elastic modulus)) is taken in the as assembled condition, such as at room temperature.

$CCF_{TE}$ is a factor having units in terms of temperature (e.g., degrees Fahrenheit) defined according to the following relationship (2):

$$\text{Conduit Contortion Factor } (CCF_{TE}) = \left|\frac{D_h - D_h'}{D_h}\right| \times T_{oil} \times \frac{\Delta H}{H} \times \frac{\alpha_2}{\alpha_1} \quad (2)$$

The $CCF_{TE}$ is the same as the $CCF_E$ except for the fourth factor. The fourth factor of the $CCF_{TE}$, as shown in relationship (2), is referred to herein as a ratio of thermal expansion ($\alpha_2/\alpha_1$). Instead of using the elastic modulus of the phases or metals ($E_2/E_1$), $CCF_{TE}$ uses a coefficient of thermal expansion and, more specifically, the linear coefficient of thermal expansion ($\alpha$). The ratio of thermal expansion ($\alpha_2/\alpha_1$) is the ratio of the linear coefficient of thermal expansion ($\alpha_2$) for the second material (or phase) to the linear coefficient of thermal expansion ($\alpha_1$) for the first material (or phase). First and second materials and phases are determined in the same manner as discussed above for the elastic modulus ratio ($E_2/E_1$) as are the temperatures at which the linear coefficient of thermal expansion ($\alpha$) are taken.

Tables 1 to 4 describe exemplary embodiments 1 to 44. Each engine in the embodiments discussed of these tables is a high by-pass turbofan engine, such as the engine 100 of FIG. 2 described above. Each engine has different operating conditions and sizes, giving rise to different oil temperatures ($T_{oil}$). The oil tube 300 used in these embodiments may be any one of the oil tubes 300 discussed above.

The embodiments shown in Table 1 are oil tubes 300 formed from a shape memory alloy. Table 1 gives values used to calculate the $CCF_E$ for the oil tube 300 of each embodiment, and Table 1 also provides the resultant $CCF_E$ for each embodiment.

TABLE 1

| Emb. | $T_{oil}$ (° F.) | $((D_h - D_h')/D_h)$ | $\Delta H$ (H type) | $\Delta H/H$ | $E_2$ (GPa) | $E_1$ (GPa) | $CCF_E$ |
|---|---|---|---|---|---|---|---|
| 1 | 400 | 0.1 | 7.5 (Length) | 0.2 | 41 | 83 | 3.95 |
| 2 | 400 | 0.1 | 7.2 (Length) | 0.25 | 41 | 83 | 4.94 |
| 3 | 405 | 0.09 | 5 (Length) | 0.2 | 38 | 83 | 3.34 |
| 4 | 401 | 0.1 | 12 (Length) | 0.25 | 41 | 83 | 4.95 |
| 5 | 390 | 0.05 | 9 (Length) | 0.15 | 45 | 83 | 1.59 |
| 6 | 440 | 0.12 | 0.5 (Width) | 0.25 | 35 | 83 | 5.57 |
| 7 | 500 | 0.15 | 0.7 (Width) | 0.25 | 25 | 83 | 5.65 |
| 8 | 250 | 0.04 | 0.3 (Width) | 0.06 | 65 | 83 | 0.47 |
| 9 | 350 | 0.08 | 0.9 (Width) | 0.08 | 45 | 83 | 1.21 |
| 10 | 406 | 0.1 | 10 (Angle (deg)) | 0.2 | 40 | 83 | 3.91 |
| 11 | 600 | 0.13 | 15 (Angle (deg)) | 0.3 | 30 | 83 | 8.46 |

The embodiments shown in Table 2 are bimetal oil tubes 300 (e.g., the axial-bimetal oil tube 308 and the circumferential-bimetal oil tube 309). Table 2 gives values used to calculate the $CCF_E$ for the oil tube 300 of each embodiment, and Table 2 also provides the resultant $CCF_E$ for each embodiment.

TABLE 2

| Emb. | $T_{oil}$ (° F.) | $((D_h - D_h')/D_h)$ | $\Delta H$ (H type) | $\Delta H/H$ | $E_2$ (GPa) | $E_1$ (GPa) | $CCF_E$ |
|---|---|---|---|---|---|---|---|
| 12 | 350 | 0.1 | 7.5 (Length) | 0.1 | 220 | 69 | 1.1 |
| 13 | 400 | 0.1 | 7.2 (Length) | 0.15 | 220 | 110 | 3.0 |
| 14 | 405 | 0.09 | 5 (Length) | 0.05 | 220 | 106 | 0.9 |
| 15 | 401 | 0.1 | 12 (Length) | 0.25 | 220 | 69 | 3.1 |
| 16 | 390 | 0.05 | 9 (Length) | 0.25 | 106 | 69 | 3.2 |

TABLE 2-continued

| Emb. | $T_{oil}$ (° F.) | $((D_h - D_h')/D_h)$ | $\Delta H$ (H type) | $\Delta H/H$ | $E_2$ (GPa) | $E_1$ (GPa) | $CCF_E$ |
|---|---|---|---|---|---|---|---|
| 17 | 440 | 0.12 | 0.5 (Width) | 0.25 | 200 | 69 | 4.6 |
| 18 | 500 | 0.15 | 0.7 (Width) | 0.25 | 106 | 69 | 12.2 |
| 19 | 250 | 0.04 | 0.3 (Width) | 0.06 | 200 | 69 | 0.2 |
| 20 | 350 | 0.08 | 0.9 (Width) | 0.08 | 106 | 69 | 1.5 |
| 21 | 406 | 0.1 | 10 (Angle (deg)) | 0.2 | 220 | 69 | 2.5 |
| 22 | 600 | 0.13 | 15 (Angle (deg)) | 0.3 | 220 | 106 | 11.3 |

The embodiments shown in Table 3 are oil tubes 300 formed from a shape memory alloy. Table 3 gives values used to calculate the $CCF_{TE}$ for the oil tube 300 of each embodiment, and Table 3 also provides the resultant $CCF_{TE}$ for each embodiment.

TABLE 3

| Emb. | $T_{oil}$ (° F.) | $((D_h - D_h')/D_h)$ | $\Delta H$ (H type) | $\Delta H/H$ | $\alpha_2$ ($10^{-6}/$° F.) | $\alpha_1$ ($10^{-6}/$° F.) | $CCF_{TE}$ |
|---|---|---|---|---|---|---|---|
| 23 | 350 | 0.1 | 7.5 (Length) | 0.1 | 3.67 | 6.1226 | 2.10 |
| 24 | 400 | 0.1 | 7.2 (Length) | 0.15 | 3.67 | 6 | 3.67 |
| 25 | 405 | 0.09 | 5 (Length) | 0.05 | 3.67 | 6.1226 | 1.09 |
| 26 | 401 | 0.1 | 12 (Length) | 0.25 | 3.67 | 6.4 | 5.75 |
| 27 | 390 | 0.05 | 9 (Length) | 0.25 | 3.67 | 6.1226 | 2.92 |
| 28 | 440 | 0.12 | 0.5 (Width) | 0.25 | 3.4 | 6.1226 | 7.33 |
| 29 | 500 | 0.15 | 0.7 (Width) | 0.25 | 3.3 | 6.1226 | 10.11 |
| 30 | 250 | 0.04 | 0.3 (Width) | 0.06 | 3.6 | 6.1226 | 0.35 |
| 31 | 350 | 0.08 | 0.9 (Width) | 0.08 | 3.5 | 6.1226 | 1.28 |
| 32 | 406 | 0.1 | 10 (Angle (deg)) | 0.2 | 3.3 | 6.1226 | 4.38 |
| 33 | 600 | 0.13 | 15 (Angle (deg)) | 0.3 | 3.6 | 6.13 | 13.74 |

The embodiments shown in Table 4 are bimetal oil tubes 300 (e.g., axial-bimetal oil tube 308 and circumferential-bimetal oil tube 309). Table 4 gives values used to calculate the $CCF_{TE}$ for the oil tube 300 of each embodiment, and Table 2 also provides the resultant $CCF_{TE}$ for each embodiment.

TABLE 4

| Emb. | $T_{oil}$ (° F.) | $((D_h - D_h')/D_h)$ | $\Delta H$ (H type) | $\Delta H/H$ | $\alpha_2$ ($10^{-6}/$° F.) | $\alpha_1$ ($10^{-6}/$° F.) | $CCF_{TE}$ |
|---|---|---|---|---|---|---|---|
| 34 | 350 | 0.1 | 7.5 (Length) | 0.1 | 7.5 | 4 | 1.87 |
| 35 | 400 | 0.1 | 7.2 (Length) | 0.15 | 7.7 | 4 | 3.12 |
| 36 | 405 | 0.09 | 5 (Length) | 0.05 | 7 | 4.3 | 1.12 |
| 37 | 401 | 0.1 | 12 (Length) | 0.25 | 7.5 | 4.5 | 6.02 |
| 38 | 390 | 0.05 | 9 (Length) | 0.25 | 7.8 | 5 | 3.13 |
| 39 | 440 | 0.12 | 0.5 (Width) | 0.25 | 7.7 | 4 | 6.86 |
| 40 | 500 | 0.15 | 0.7 (Width) | 0.25 | 8 | 4 | 9.38 |
| 41 | 250 | 0.04 | 0.3 (Width) | 0.06 | 7.5 | 4 | 0.32 |
| 42 | 350 | 0.08 | 0.9 (Width) | 0.08 | 7 | 4.5 | 1.44 |
| 43 | 406 | 0.1 | 10 (Angle (deg)) | 0.2 | 7.4 | 4.2 | 4.61 |
| 44 | 600 | 0.13 | 15 (Angle (deg)) | 0.3 | 7 | 4 | 13.37 |

The interior ridges 332 and the interior grooves 334 impact the amount of movement and thus the ability of the oil tube 300 to break up coke deposits. At the same time, interior ridges 332 or interior grooves 334 impact the flow dynamics of the oil through the flow passage 326 of the oil tube 300, and different hydraulic diameters ($D_h'$) of the oil tube 300, thus, result in different resistances (pressure drops) within the flow passage 326, for example. Balancing these considerations and other considerations discussed below, the hydraulic diameter ratio ($D_h - D_h'/D_h$) is preferably from one hundredth (0.01) to fifteen hundredths (0.15) and, more preferably, from five hundredths (0.05) to one tenth (0.01).

Some small amount of movement of the oil tube 300 is necessary to break-up the coke deposits, and, in some embodiments, the deformation factor (ΔH/H) five hundredths (0.05) or greater. Greater amounts of movement, however, are advantageous in breaking-up the coke deposits and the deformation factor (ΔH/H) is preferably one tenth (0.01) or greater. Movements that are too great, however, may introduce other problems such as fatigue or other issues that result because of the constraints imposed by the outer end 314 and the inner end 316, as discussed above. To avoid such issues, the deformation factor (ΔH/H) is preferably twenty-five hundredths (0.25) or less, and, more preferably, two tenths (0.2) or less. The deformation factor (ΔH/H), thus, is from five hundredths (0.05) to twenty-five hundredths (0.25) and, preferably, from one tenth (0.1) to two tenths (0.2).

There are a wide variety of shape memory alloys that can be used to form the oil tubes 300 discussed above and even within one alloy, the elastic modulus of each phase can be tuned. Likewise, there are a wide variety of different metals that can be used to form the first strips 352 and the second strips 354. As noted above, the oil tube 300 moves during thermal cycling under constraint. The elastic modulus ratio ($E_2/E_1$) or the ratio of thermal expansion ($\alpha_2/\alpha_1$) is preferably selected in connection with the deformation factor (ΔH/H) to avoid responses (movement) leading to cyclic failure of the oil tube 300. Accordingly, the elastic modulus ratio ($E_2/E_1$) preferably is from three tenths (0.3) to eight tenths (0.8) and, more preferably, from four tenths (0.4) to six tenths (0.6). Similarly, the ratio of thermal expansion ($\alpha_2/\alpha_1$) preferably is from three tenths (0.3) to eight tenths (0.8) and, more preferably, from five tenths (0.5) to seven tenths (0.7).

Figure 21A:
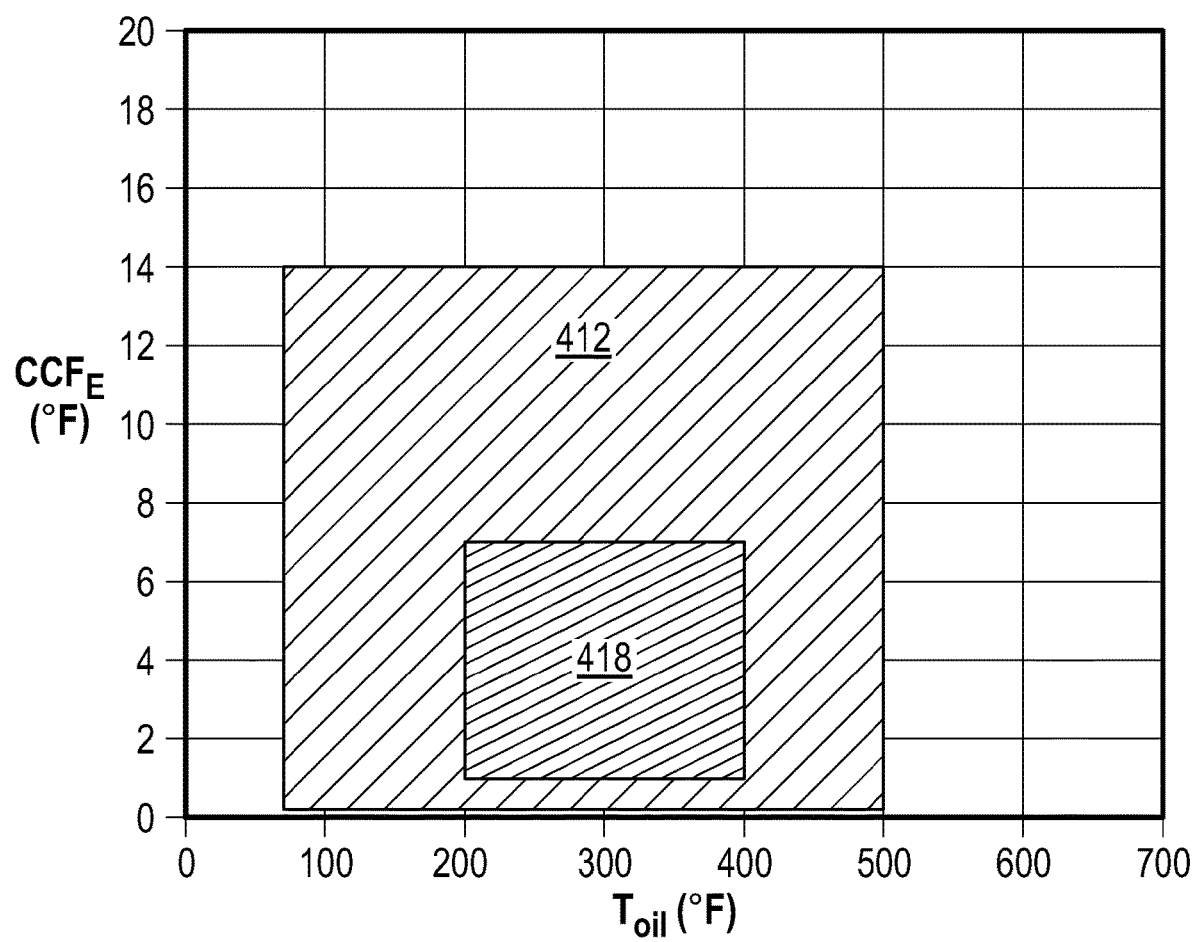
FIGS. 21A and 21B are graphs illustrating an elastic conduit contortion factor ($CCF_E$) as a function of the oil temperature, according to embodiments of the present disclosure.
Figure 21B:
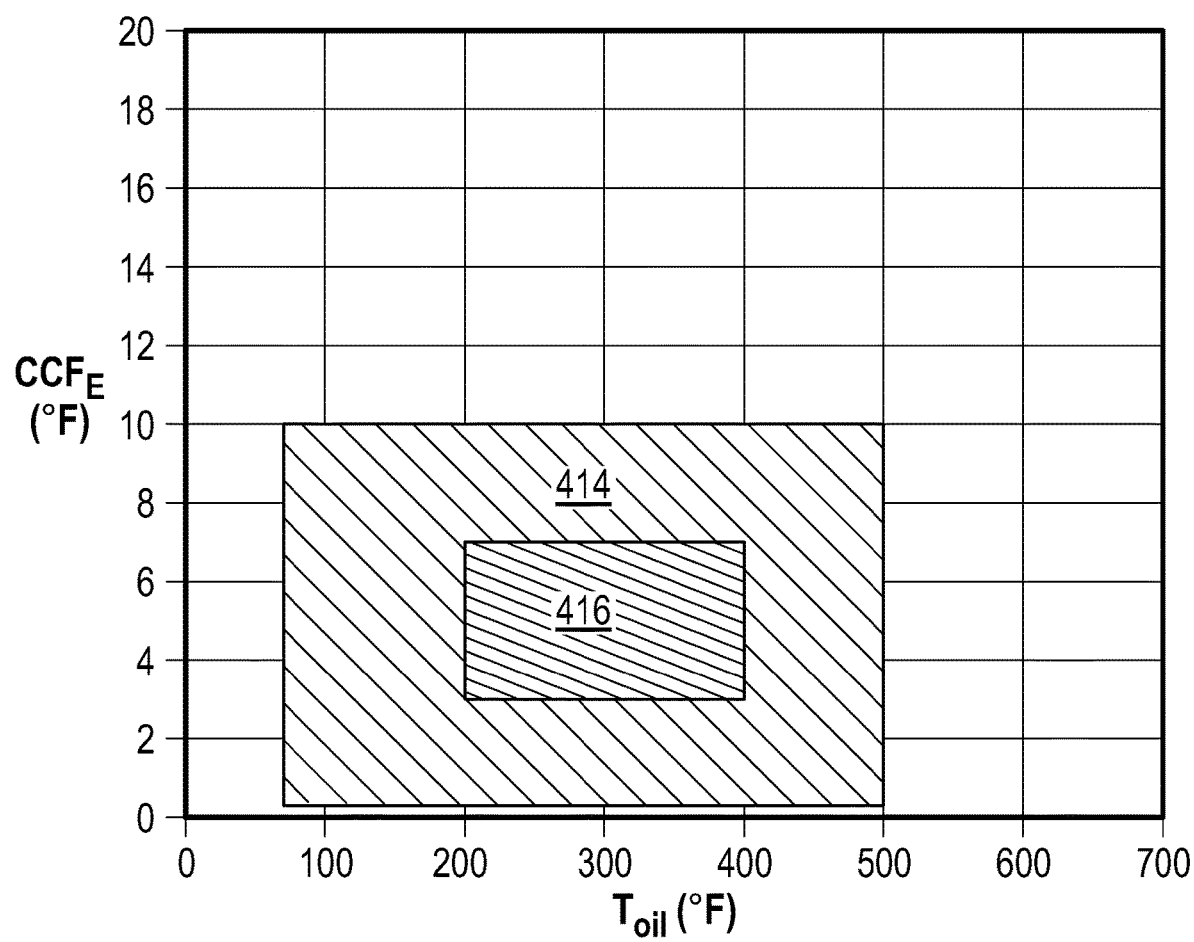
Figure 22A:
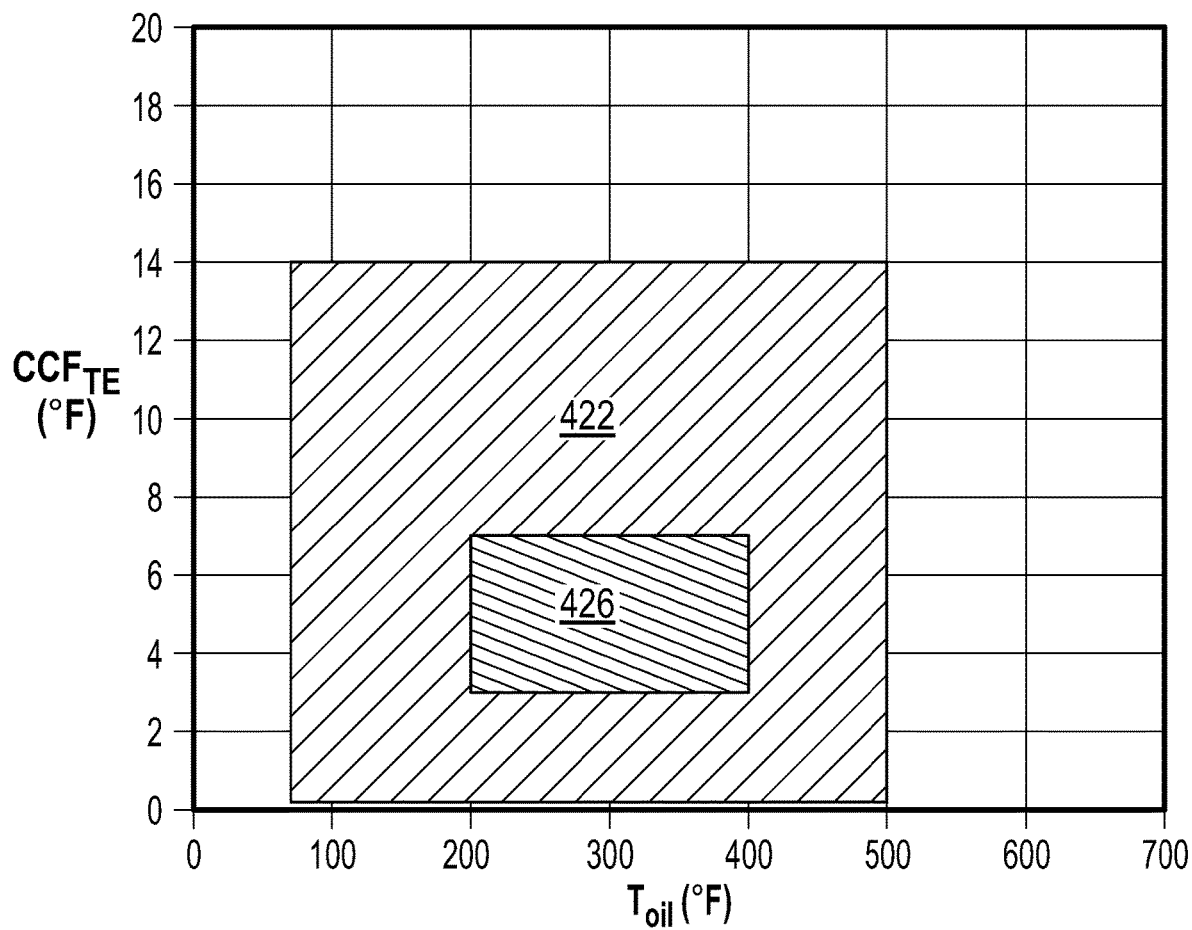
FIGS. 22A and 22B are graph illustrating a thermal expansion conduit contortion factor ($CCF_{TE}$) as a function of the oil temperature to the temperature of the oil tube, according to embodiments of the present disclosure.
Figure 22B:
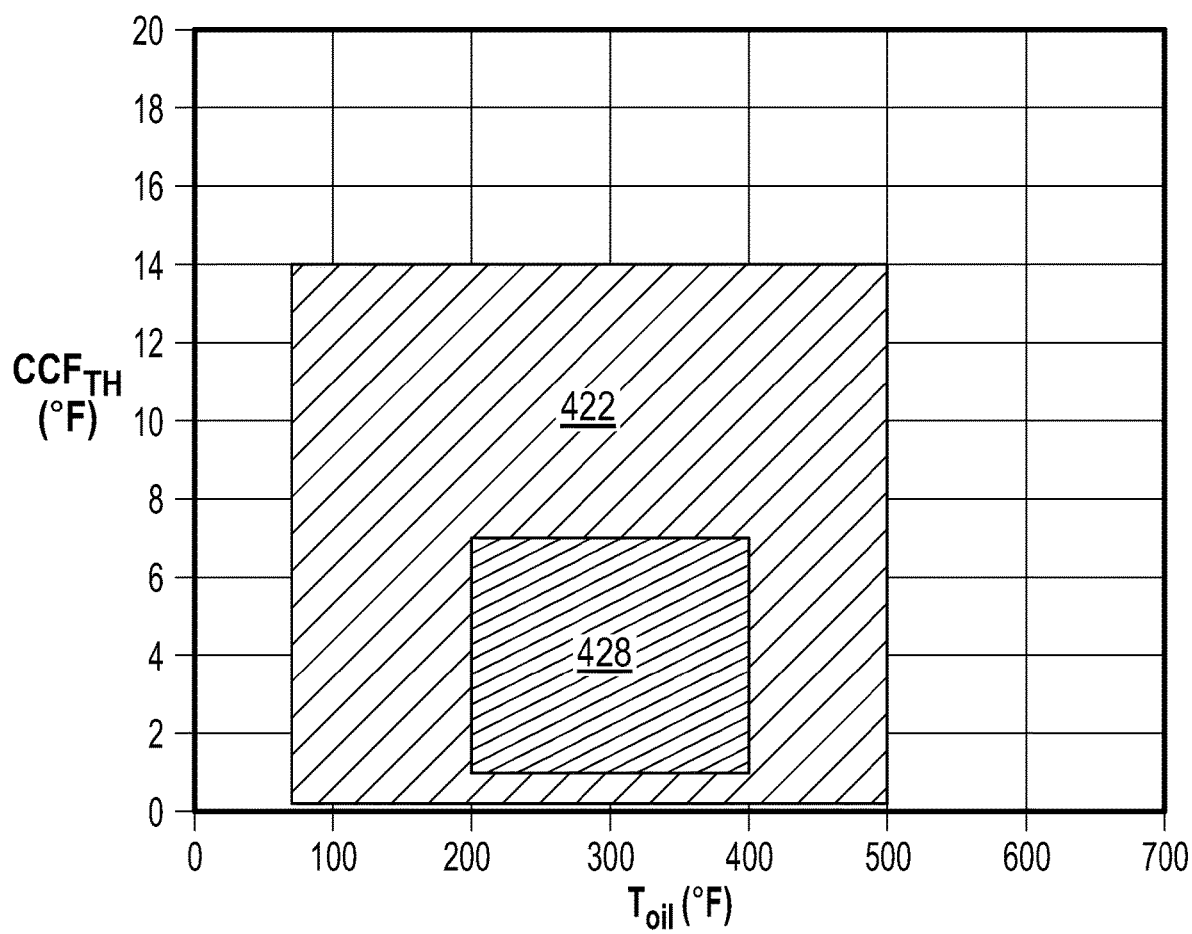

FIGS. 21A to 22B represent, in graph form, the CCF as a function of the temperature of the oil ($T_{oil}$). FIGS. 21A and 21B show the $CCF_E$ as a function of the temperature of the oil ($T_{oil}$), and FIGS. 22A and 22B show the $CCF_{TE}$ as a function of the temperature of the oil ($T_{oil}$). In FIGS. 21A to 22B, the cross-hatched areas represent the boundaries of the CCF for configurations of the oil tube 300 that provide sufficient movement to disturb the coke formation within the engine 100.

In FIG. 21A, one set of preferred boundaries for the $CCF_E$ is shown by an area 412. The $CCF_E$ is preferably from two tenths degrees Fahrenheit (0.2° F.) to fourteen degrees Fahrenheit (14° F.), and the temperature of the oil ($T_{oil}$) is from room temperature (about seventy degrees Fahrenheit (70° F.)) to five hundred degrees Fahrenheit (500° F.). At high oil temperatures ($T_{oil}$), above about five hundred degrees Fahrenheit (500° F.), for example, the rate of coking is significant and may result in clogging of the oil tube 300 before the thermal cycling discussed above can occur to break up the coke deposits. This high coking rate is preferably avoided and thus the oil temperatures ($T_{oil}$) preferably is five hundred degrees Fahrenheit (500° F.) or less.

In FIG. 21B, another set of preferred boundaries for the $CCF_E$ is shown by an area 414. This set of preferred boundaries applies to oil tubes 300 formed from a shape memory alloy. In such embodiments, the range of $CCF_E$ providing sufficient movement to disturb the coke formation within the engine 100 is more preferably from three tenths degrees Fahrenheit (0.3° F.) to ten degrees Fahrenheit (10° F.), and the temperature of the oil ($T_{oil}$) is from room temperature (about seventy degrees Fahrenheit (70° F.)) to five hundred degrees Fahrenheit (500° F.).

In FIG. 21B, a further set of preferred boundaries $CCF_E$ is shown by an area 416. For many of the aircraft applications discussed herein, coke does not form at temperatures less than two hundred degrees Fahrenheit (200° F.), and, to avoid the high rates of coke formation at high temperatures, as discussed above, the temperature of the oil ($T_{oil}$) is more preferably less than four hundred degrees Fahrenheit (400° F.). For oil tubes 300 formed from a shape memory alloy, the $CCF_E$ is even more preferably from three degrees Fahrenheit (3° F.) to seven degrees Fahrenheit (7° F.) for temperatures of the oil ($T_{oil}$) from two hundred degrees Fahrenheit (200° F.) to four hundred degrees Fahrenheit (400° F.).

FIG. 21A shows a set of preferred boundaries $CCF_E$ by an area 418 for bimetal oil tubes 300 (e.g., the axial-bimetal oil tube 308 and the circumferential-bimetal oil tube 309) over the more preferred temperature range of the oil ($T_{oil}$). For bimetal oil tubes 300, the $CCF_E$ is preferably from one degree Fahrenheit (1° F.) to seven degrees Fahrenheit (7° F.) for temperatures of the oil ($T_{oil}$) from two hundred degrees Fahrenheit (200° F.) to four hundred degrees Fahrenheit (400° F.).

FIGS. 22A and 22B show the $CCF_{TE}$ as a function of the temperature of the oil ($T_{oil}$). The area 422 shows one set of preferred boundaries regardless of whether oil tube 300 is a shape memory alloy or formed from two different metals with different thermal expansion coefficients (bimetal oil tube 300). The $CCF_{TE}$ is preferably from two tenths degrees Fahrenheit (0.2° F.) to fourteen degrees Fahrenheit (14° F.), and the temperature of the oil ($T_{oil}$) is from room temperature (about seventy degrees Fahrenheit (70° F.)) to five hundred degrees Fahrenheit (500° F.).

In FIG. 22A, the area 426 shows another set of preferred boundaries for an oil tube 300 formed from a shape memory alloy over the more preferred temperature range of the oil ($T_{oil}$) (two hundred degrees Fahrenheit (200° F.) to four hundred degrees Fahrenheit (400° F.)). The range of $CCF_{TE}$ in area 426 is from three degrees Fahrenheit (3° F.) to seven degrees Fahrenheit (7° F.) for temperatures of the oil ($T_{oil}$) from two hundred degrees Fahrenheit (200° F.) to four hundred degrees Fahrenheit (400° F.).

In FIG. 22B, the area 428 shows a set of preferred boundaries for a bimetal oil tube 300 over the more preferred temperature range of the oil ($T_{oil}$) (two hundred degrees Fahrenheit (200° F.) to four hundred degrees Fahrenheit (400° F.)). The range of $CCF_{TE}$ in the area 428 is from one degree Fahrenheit (1° F.) to seven degrees Fahrenheit (7° F.) for temperatures of the oil ($T_{oil}$) from two hundred degrees Fahrenheit (200° F.) to four hundred degrees Fahrenheit (400° F.).

As can be seen from this discussion, the inventors have surprisingly found that the preferred boundaries of the $CCF_{TE}$ are the same as those for the $CCF_E$.

Further aspects of the present disclosure are provided by the subject matter of the following clauses.

A self-cleaning conduit for a hydrocarbon fluid comprises a tube having an interior surface defining a flow passage for the hydrocarbon fluid, the tube being formed of (i) a shape memory alloy or (ii) a first metal and a second metal, the second metal having a coefficient of thermal expansion different from the first metal, and at least one of a plurality of recesses and a plurality of protrusions formed on the interior surface of the tube within the flow passage, the tube being characterized by a conduit contortion factor (CCF) from 0.2° F. to 14° F., the conduit contortion factor (CCF) being one of an elastic conduit contortion factor ($CCF_E$) and thermal expansion conduit contortion factor ($CCF_{TE}$).

The conduit of the preceding clause, the hydrocarbon fluid being oil, the oil being configured to be operated at a temperature from 70° F. to 500° F.

The conduit of any preceding clause, the hydrocarbon fluid being oil, the oil being configured to be operated at a temperature from 200° F. to 400° F.

The conduit of any preceding clause, the tube being characterized by a hydraulic diameter ratio from 0.01 to 0.15.

The conduit of any preceding clause, the tube being characterized by a hydraulic diameter ratio from 0.05 to 0.1.

The conduit of any preceding clause, the tube being characterized by a deformation factor from 0.05 to 0.25.

The conduit of any preceding clause, the tube being characterized by a deformation factor from 0.1 to 0.2.

The conduit of any preceding clause, the conduit contortion factor (CCF) being the elastic conduit contortion factor ($CCF_E$), and the tube is characterized by an elastic modulus ratio from three tenths 0.3 to eight tenths 0.8.

The conduit of any preceding clause, the conduit contortion factor (CCF) being the elastic conduit contortion factor ($CCF_E$), and the tube is characterized by an elastic modulus ratio from 0.5 to 0.7.

The conduit of any preceding clause, the tube being formed of a shape memory alloy, the shape memory alloy being one of a nickel-titanium alloy, a cobalt-nickel-aluminum alloy, or a nickel-iron-gallium alloy.

The conduit of any preceding clause, the tube being formed of the shape memory alloy and the conduit contortion factor (CCF) is from 0.3° F. to 10° F.

The conduit of any preceding clause, the tube being formed of the shape memory alloy and the conduit contortion factor (CCF) is from 3° F. to 7° F.

The conduit of any preceding clause, the tube being formed from the first metal having a thermal expansion coefficient and a second metal having the thermal expansion coefficient, the thermal expansion coefficient of the first metal being different from the thermal expansion coefficient of the second metal by at least 15%.

The conduit of any preceding clause, the thermal expansion coefficient of the first metal being different from the thermal expansion coefficient of the second metal by at least 30%.

The conduit of any preceding clause, the conduit contortion factor (CCF) being from 1° F. to 7° F.

The conduit of any preceding clause, the conduit contortion factor (CCF) being the thermal expansion conduit contortion factor ($CCF_{TE}$), and the tube is characterized by a ratio of thermal expansion from 0.3 to 0.8.

The conduit of any preceding clause, the conduit contortion factor (CCF) being the thermal expansion conduit contortion factor ($CCF_{TE}$), and the tube is characterized by a ratio of thermal expansion from 0.5 to 0.7.

The conduit of any preceding clause, the tube including a plurality of first strips and a plurality of second strips, each of the plurality of first strips being formed from the first metal and each of the plurality of second strips being formed from the second metal.

The conduit of any preceding clause, the first strips being parallel to each other and the plurality of second strips are parallel to each other.

The conduit of any preceding clause, the tube including an axial direction, the plurality of first strips being aligned in a direction parallel to the axial direction and the plurality of second strips being aligned in a direction parallel to the axial direction.

The conduit of any preceding clause, the tube including a circumferential direction, the plurality of first strips being aligned in a direction parallel to the circumferential direction and the plurality of second strips being aligned in a direction parallel to the circumferential direction.

The conduit of any preceding clause, the tube including the plurality of protrusions formed on the interior surface within the flow passage, the plurality of protrusions being a plurality of ridges extending from the interior surface into the flow passage.

The conduit of any preceding clause, the tube including an axial direction, and the plurality of ridges are aligned in a direction parallel to the axial direction.

The conduit of any preceding clause, the tube including a circumferential direction, and the plurality of ridges are aligned in a direction parallel to the circumferential direction.

The conduit of any preceding clause, each ridge of the plurality of ridges being helical.

The conduit of any preceding clause, the plurality of ridges forming a lattice pattern.

The conduit of any preceding clause, the plurality of ridges having a double helical arrangement to form a lattice pattern.

The conduit of any preceding clause, the tube including the plurality of recesses formed on the interior surface within the flow passage, the plurality of recesses being a plurality of grooves formed in the interior surface into the flow passage.

The conduit of any preceding clause, the tube including an axial direction, and the plurality of grooves are aligned in a direction parallel to the axial direction.

The conduit of any preceding clause, the tube including a circumferential direction, and the plurality of grooves are aligned in a direction parallel to the circumferential direction.

The conduit of any preceding clause, each ridge of the plurality of grooves being helical.

The conduit of any preceding clause, the tube including a plurality of exterior protrusions formed on an exterior surface of the tube.

The conduit of any preceding clause, the plurality of protrusions being a plurality of exterior ridges extending from the exterior surface.

The conduit of any preceding clause, each exterior ridge of the plurality of exterior ridges being helical.

The conduit of any preceding clause, the tube including a plurality of exterior recesses formed on an exterior surface of the tube.

The conduit of any preceding clause, the plurality of recesses exterior being a plurality of exterior grooves formed in the exterior surface.

The conduit of any preceding clause, each groove of the plurality of grooves being helical.

A lubrication system comprises an oil reservoir configured to hold oil and an oil sump fluidly connected to the oil reservoir by the conduit of any preceding clause, the hydrocarbon fluid being the oil.

The lubrication system of any preceding clause, further comprising a pump fluidly connected to each of the oil reservoir and the oil sump and configured to circulate the oil through the conduit.

A gas turbine engine comprises the lubrication system of any preceding clause, a compressor section including at least one rotor, the at least one rotor being configured to compress air flowing therethrough, a combustion section configured to mix fuel with the compressed air and to combust the mixture of fuel and air to generate combustion products, and a turbine section including at least one turbine configured to be driven by the combustion products, the compressor section, the combustion section, and the turbine section together defining at least a portion of a core air flow path, the conduit being located in the core air flow path.

The gas turbine engine of any preceding clause, further comprising at least one frame, that frame includes at least one service tube assembly, the service tube assembly having the conduit.

The gas turbine engine of any preceding clause, the frame including a plurality of service tube assemblies.

The gas turbine engine of any preceding clause, the frame being a turbine rear frame.

The gas turbine engine of any preceding clause, further comprising a shaft connecting the at least one turbine with the at least one rotor and a bearing supporting the shaft, the frame providing structural load paths from the bearing.

The gas turbine engine of any preceding clause, the lubrication system being configured to provide oil to the bearing.

Although the foregoing description is directed to the preferred embodiments, other variations and modifications will be apparent to those skilled in the art, and may be made without departing from the spirit or the scope of the disclosure. Moreover, features described in connection with one embodiment may be used in conjunction with other embodiments, even if not explicitly stated above.

The invention claimed is:

1. A self-cleaning conduit for a hydrocarbon fluid, the conduit comprising:
   a tube having an interior surface defining a flow passage for the hydrocarbon fluid, the tube being formed of (i) a shape memory alloy or (ii) a first metal and a second metal, the second metal having a coefficient of thermal expansion different from the first metal; and
   at least one of a plurality of recesses and a plurality of protrusions formed on the interior surface of the tube within the flow passage,
   wherein the tube is characterized by a conduit contortion factor (CCF) from 0.2° F. to 14° F., the conduit contortion factor (CCF) being one of an elastic conduit contortion factor ($CCF_E$) and thermal expansion conduit contortion factor ($CCF_{TE}$).

2. The conduit of claim 1, wherein the hydrocarbon fluid is oil, the oil being configured to be operated at a temperature from 70° F. to 500° F.

3. The conduit of claim 1, wherein the hydrocarbon fluid is oil, the oil being configured to be operated at a temperature from 200° F. to 400° F.

4. The conduit of claim 1, wherein the tube is characterized by a hydraulic diameter ratio from 0.01 to 0.15.

5. The conduit of claim 1, wherein the tube is characterized by a hydraulic diameter ratio from 0.05 to 0.1.

6. The conduit of claim 1, wherein the tube is characterized by a deformation factor from 0.05 to 0.25.

7. The conduit of claim 1, wherein the tube is characterized by a deformation factor from 0.1 to 0.2.

8. The conduit of claim 1, wherein the conduit contortion factor (CCF) is the elastic conduit contortion factor ($CCF_E$), and the tube is characterized by an elastic modulus ratio from three tenths 0.3 to eight tenths 0.8.

9. The conduit of claim 1, wherein the conduit contortion factor (CCF) is the elastic conduit contortion factor ($CCF_E$), and the tube is characterized by an elastic modulus ratio from 0.5 to 0.7.

10. The conduit of claim 1, wherein the tube is formed of the shape memory alloy and the conduit contortion factor (CCF) is from 0.3° F. to 10° F.

11. The conduit of claim 1, wherein the tube is formed of the shape memory alloy and the conduit contortion factor (CCF) is from 3° F. to 7° F.

12. The conduit of claim 1, wherein the tube includes the plurality of recesses formed on the interior surface within the flow passage, the plurality of recesses being a plurality of grooves formed in the interior surface into the flow passage.

13. The conduit of claim 1, wherein the tube includes at least one of a plurality of exterior protrusions formed on an exterior surface of the tube and a plurality of exterior recesses formed on an exterior surface of the tube.

14. The conduit of claim 1, wherein the tube is formed from the first metal having a thermal expansion coefficient and the second metal having a thermal expansion coefficient, the thermal expansion coefficient of the first metal being different from the thermal expansion coefficient of the second metal by at least 15%.

15. The conduit of claim 14, wherein the thermal expansion coefficient of the first metal is different from the thermal expansion coefficient of the second metal by at least 30%.

16. The conduit of claim 14, wherein the conduit contortion factor (CCF) is from 1° F. to 7° F.

17. The conduit of claim 14, wherein the conduit contortion factor (CCF) is the thermal expansion conduit contortion factor ($CCF_{TE}$), and the tube is characterized by a ratio of thermal expansion from 0.3 to 0.8.

18. The conduit of claim 14, wherein the conduit contortion factor (CCF) is the thermal expansion conduit contortion factor ($CCF_{TE}$), and the tube is characterized by a ratio of thermal expansion from 0.5 to 0.7.

19. The conduit of claim 14, wherein the tube includes a plurality of first strips and a plurality of second strips, each of the plurality of first strips being formed from the first metal and each of the plurality of second strips being formed from the second metal.

20. A lubrication system comprising:
    an oil reservoir configured to hold oil;
    an oil sump; and
    a self-cleaning conduit fluidly connecting the oil sump to the oil reservoir to have the oil flow between the oil sump and the oil reservoir, the conduit including:
       a tube having an interior surface defining a flow passage for the oil, the tube being formed of (i) a shape memory alloy or (ii) a first metal and a second metal, the second metal having a coefficient of thermal expansion different from the first metal; and
       at least one of a plurality of recesses and a plurality of protrusions formed on the interior surface of the tube within the flow passage,
       wherein the tube is characterized by a conduit contortion factor (CCF) from 0.2° F. to 14° F., the conduit contortion factor (CCF) being one of an elastic conduit contortion factor ($CCF_E$) and thermal expansion conduit contortion factor ($CCF_{TE}$).

* * * * *